(12) United States Patent
Johnson et al.

(10) Patent No.: US 10,183,215 B2
(45) Date of Patent: Jan. 22, 2019

(54) SYSTEMS AND METHODS FOR PROVIDING A VIRTUAL WORLD COMMODITY DEVICE

(71) Applicants: Ashley Johnson, Cleveland, GA (US); Chris D. Moreau, Cumming, GA (US)

(72) Inventors: Ashley Johnson, Cleveland, GA (US); Chris D. Moreau, Cumming, GA (US)

(73) Assignee: You42, Inc., Wilmington, DE (US)

( * ) Notice: Subject to any disclaimer, the term of this patent is extended or adjusted under 35 U.S.C. 154(b) by 366 days.

(21) Appl. No.: 14/090,747

(22) Filed: Nov. 26, 2013

(65) Prior Publication Data

US 2014/0094320 A1 Apr. 3, 2014

Related U.S. Application Data

(63) Continuation of application No. 12/744,287, filed as application No. PCT/US2008/084380 on Nov. 21, 2008, now Pat. No. 8,595,811.

(60) Provisional application No. 60/989,461, filed on Nov. 21, 2007.

(51) Int. Cl.
*A63F 13/55* (2014.01)
*A63F 13/30* (2014.01)
*G06Q 30/02* (2012.01)

(52) U.S. Cl.
CPC ............. *A63F 13/12* (2013.01); *G06Q 30/02* (2013.01)

(58) Field of Classification Search
CPC ...... A63F 13/12; A63F 13/55; A63F 2300/69; G06Q 30/02
USPC ......................................................... 463/43
See application file for complete search history.

(56) References Cited

U.S. PATENT DOCUMENTS

| | | | |
|---|---|---|---|
| 7,035,653 B2 * | 4/2006 | Simon .................... | G06Q 30/02 455/414.1 |
| 8,132,235 B2 | 3/2012 | Bussani et al. | |
| 2003/0027636 A1 * | 2/2003 | Covannon ............... | G06F 3/002 463/42 |
| 2004/0229696 A1 * | 11/2004 | Beck ....................... | A63F 13/02 463/40 |
| 2005/0137016 A1 * | 6/2005 | Enzminger ............. | G07F 17/32 463/42 |
| 2007/0197297 A1 * | 8/2007 | Witchey ................... | A63F 9/24 463/42 |
| 2008/0009345 A1 | 1/2008 | Bailey et al. | |
| 2008/0081694 A1 * | 4/2008 | Hong ....................... | A63F 13/02 463/34 |

(Continued)

OTHER PUBLICATIONS

Pepalis, "Talent draws Kiz Toys to area", Jul. 28, 2008, Business Post, p. 1-3.

*Primary Examiner* — Allen Chan
(74) *Attorney, Agent, or Firm* — Troutman Sanders LLP; Dustin B. Weeks; Micah B. Hensley

(57) ABSTRACT

The present invention describes methods and apparatus to enable efficient and protected interaction with a virtual world environment. An exemplary embodiment of the present invention provides a system including a virtual world commodity device including a housing and a memory. Furthermore, the system includes a product unique identifier stored in the memory of the virtual world commodity device. The virtual world commodity device is enabled to communicate with a virtual world environment to provide the product unique identifier and the virtual world environment provides a globally unique identifier to be stored in the memory of the virtual world commodity device.

20 Claims, 51 Drawing Sheets

(56) References Cited

U.S. PATENT DOCUMENTS

| | | | |
|---|---|---|---|
| 2008/0139080 A1* | 6/2008 | Zheng | A63H 3/28 |
| | | | 446/268 |
| 2009/0029768 A1 | 1/2009 | Ganz | |
| 2009/0119764 A1 | 5/2009 | Applewhite et al. | |
| 2009/0131164 A1 | 5/2009 | Ganz | |
| 2009/0204420 A1 | 8/2009 | Ganz | |
| 2010/0050237 A1 | 2/2010 | Bokor et al. | |
| 2010/0106512 A1 | 4/2010 | Hyndman et al. | |
| 2010/0107214 A1 | 4/2010 | Ganz | |
| 2010/0222139 A1 | 9/2010 | Wang | |
| 2011/0126272 A1 | 5/2011 | Betzler et al. | |
| 2011/0167481 A1 | 7/2011 | Ganz | |
| 2011/0167485 A1 | 7/2011 | Ganz | |
| 2011/0251928 A1 | 10/2011 | Van Buskirk et al. | |
| 2011/0258684 A1 | 10/2011 | Ganz | |

* cited by examiner

100

100

100

100

100

100

100

100

100

100

100

100

100

100

100

100

100

100

3800

SYSTEMS AND METHODS FOR PROVIDING A VIRTUAL WORLD COMMODITY DEVICE

CROSS REFERENCE TO RELATED APPLICATION

This application is a continuation of U.S. patent application Ser. No. 12/744,287, filed 4 Nov. 2010, which is a United States National Stage Application of International Patent Application No. PCT/US08/84380, filed 21 Nov. 2008, which claims the benefit of U.S. Provisional Application No. 60/989,461, filed 21 Nov. 2007, all of which are hereby incorporated by reference in their entirety as if fully set forth below.

FIELD OF THE INVENTION

This invention relates generally to interactive virtual worlds and more particularly virtual world environments that provide users with the ability to obtain virtual commodities.

BACKGROUND OF THE INVENTION

Interactive computing has grown exponentially in direct proportion to the rapid growth and advancement in processing speeds, graphical capabilities, and integrated networking of personal computers. As the daily lives of consumers become more digitally integrated, more and more consumers are working, playing, shopping, and socializing in online communities. More specifically, users are interacting in public and private virtual worlds. Significantly, virtual world interactive computing has become increasingly popular among children and young adults. Many prior art systems have been created to attempt to provide ways for children to interact with both real and virtual toys.

For example, U.S. Patent Publication No. 2005/0287925 ("'925 Publication), filed Oct. 8, 2004, discloses a collectable item with a human readable code to provide access to interactive games. The collectable item disclosed in the '925 Publication is a toy with a human readable code. The '925 Publication describes that this human readable code is to be laser etched onto the plastic or metal chassis of the toy. The user can enter the numeric human readable code etched onto the side of the toy into computer software and then create a user account to gain access to an interactive game, card game, web based game or internet game. The human readable code can provide the user with access privileges to special sites, boards, levels, skill sets or powers.

U.S. Patent Publication No. 2005/0177428 ("'428 Publication), filed Dec. 30, 2004, provides a system in which user can purchase a toy in a retail store including a unique registration code. The '428 Publication discloses that the user can register the toy online by providing the unique registration code for that toy to an online website. The '428 Publication specifies that the Registration Subsystem can register the user by causing the user to create a user account with a user ID and password, and further the Registration Subsystem can examine "the registration code against stored data relating to a plurality of registration codes each representing a toy for sale." ('428 Publication at ¶44). Therefore, each toy is provided with a unique registration code that can be validated for access to a restricted online environment.

While interaction in virtual worlds can provide many benefits to the user, it can also bring unwanted risks and burdens. Significantly, many problems have arisen in the prior art with respect to enabling virtual world users to maintain and transfer assets obtained in a virtual world. Furthermore, virtual world environments often require a user to create an account or profile to gain access to the virtual world. For example, as disclosed in the '428 Publication, the user is required to provide personal information to the virtual world registration module in order to create an account. Thereby, the virtual world environment is enabled to keep track of the user and monitor the user's activities, purchases, and interactions. Furthermore, systems such as the one described in the '428 Publication, can track the use of particular toy because access is conditioned upon entry of unique registration code provided with each toy. Despite the requirements, users desire to limit the amount of information that they share with or is tracked by a virtual world environment.

The desire to limit the amount of personal information shared in a virtual world environment is especially important when the users are children or young adults. Unfortunately, many juveniles create accounts and share information in virtual world environments without the knowledge of their parents. Online activity by juveniles is often difficult for parents to monitor or restrict because there is no physical toy to take away from the juveniles. Mass media has given significant attention to the grave risks and dangers associated with the unsecured sharing of the personal information of juveniles on public websites, including child predators and solicitation. This problem is exacerbated by the fact that virtual world interactive computing has become highly popular for children and young adults.

In addition to providing ways to limit or eliminate the sharing of personally identifying information with a virtual world environment, users desire the ability to acquire, maintain, and transfer assets obtained in a virtual world environment. Prior art systems are inefficient in enabling effective retention and transfer of assets by a virtual world user. Significantly, users do not have a means by which to exchange a tangible object to effectuate a transfer of virtual world assets or commodities. Additionally, virtual world commodities in the prior art systems are associated with a particular user account and thus difficult to transfer between users. While the virtual world systems of the prior art accomplish their intended purposes, they provide poor protection for the users of a virtual world environment and do not enable efficient means by which to maintain and transfer virtual world commodities.

Therefore, it would be advantageous to provide an apparatus and method for providing a device that can enable anonymous access to a restricted virtual world environment. Additionally, it would be advantageous to provide an apparatus and method to enable virtual world commodities to be stored and transferred on a tangible device.

BRIEF SUMMARY OF THE INVENTION

The present invention describes methods and apparatus to enable efficient and secure interaction with a virtual world environment. An exemplary embodiment of the present invention provides a system including a virtual world commodity device including a housing and a memory. Furthermore, the system includes a product unique identifier stored in the memory of the virtual world commodity device. The virtual world commodity device is enabled to communicate with a virtual world environment to provide the product unique identifier and the virtual world environment provides a globally unique identifier to be stored in the memory of the virtual world commodity device.

In addition to systems for providing a virtual world commodity device, the present invention provides related methods. In an exemplary embodiment, the present invention provides a method that includes providing a virtual world commodity device including a housing and a memory in communication with the housing and enabling communication between the virtual world commodity device and a virtual world environment. Furthermore, the method includes sending a product unique identifier from the virtual world commodity device to the virtual world environment and authenticating the product unique identifier of the virtual world commodity device in the virtual world environment. Finally, the method involves sending a globally unique identifier from the virtual world environment to the virtual world commodity device.

These and other objects, features and advantages of the present invention will become more apparent upon reading the following specification in conjunction with the accompanying drawing figures.

DETAILED DESCRIPTION OF PREFERRED EMBODIMENTS

Figure 1:
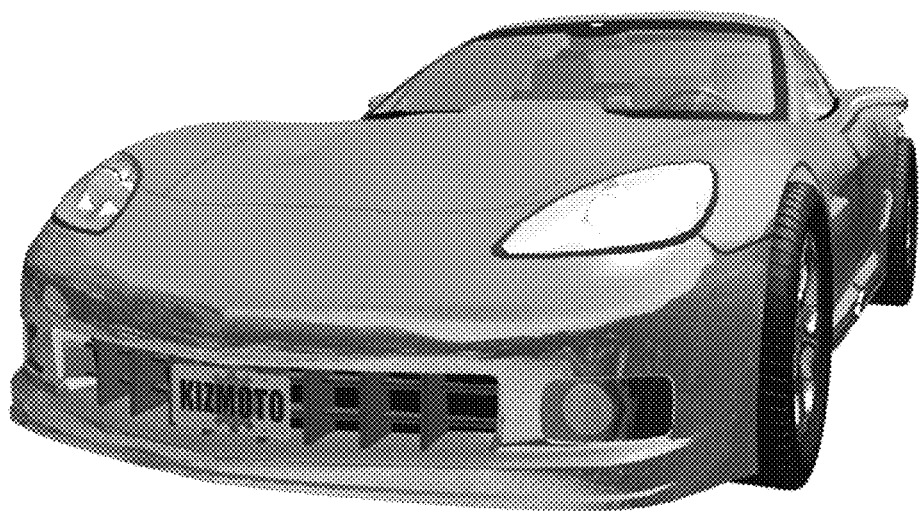
FIGS. 1 and 2 provide a perspective view of a toy system 100 in accordance with an exemplary embodiment of the present invention.

The present invention addresses the drawbacks of conventional systems and methods of interacting with virtual world environments. More particularly, the present invention addresses deficiencies and drawbacks in the prior art with respect to virtual world environments in which a user acquires and maintains an individual user account of various virtual world commodities.

In many cases, each individual virtual world environment of the prior art requires a user to create an individual login for the virtual world environment and requires the user to share personal information to obtain access to a virtual world environment. Often it is difficult for the user to keep track of the logins for various accounts and the user does not have the capability to transfer the assets of a particular account to another user. Additionally, in many circumstances, the user does not wish to share his or her personal information with the virtual world environment. Additionally, it is burdensome for the user to create and keep track of account information for each individual virtual world environment. Sharing of personal information is especially problematic for young children and juveniles who wish to gain access and create accounts or profiles in certain virtual world environments. Many parents and guardians do not wish to share personal information regarding their children with a virtual world environment or generally on the internet.

Therefore, systems and methods are desired that provide users to interact with a virtual world environment without providing personal information or maintaining a user login. Furthermore, systems and methods are desired that allow user to transfer virtual world commodities to other users. The present invention provides systems and methods that enable users to anonymously interact with virtual world environments. Significantly, the present invention also provides systems and methods that enable users to obtain virtual world commodities and transfer virtual world commodities to another user.

An exemplary embodiment of the present invention provides a system including a virtual world commodity device including a housing and a memory. Furthermore, the system includes a product unique identifier stored in the memory of the virtual world commodity device. The virtual world commodity device is enabled to communicate with a virtual world environment to provide the product unique identifier and the virtual world environment provides a globally unique identifier to be stored in the memory of the virtual world commodity device.

In addition to systems for providing a virtual world commodity device, the present invention provides related methods. In an exemplary embodiment, the present invention provides a method that includes providing a virtual world commodity device including a housing and a memory in communication with the housing and enabling communication between the virtual world commodity device and a virtual world environment. Furthermore, the method includes sending a product unique identifier from the virtual world commodity device to the virtual world environment and authenticating the product unique identifier of the virtual world commodity device in the virtual world environment. Finally, the method involves sending a globally unique identifier from the virtual world environment to the virtual world commodity device.

In an exemplary embodiment, the virtual world commodity device can be provided as part of a toy system. Therefore, the virtual world commodity device can be integrated into or sold along with a toy housing. In purchasing the toy system, the user can obtain a virtual world commodity device, which permits interaction with a virtual world environment.

The term "virtual world" is used herein to describe computer-based simulations of environments that can exist on a single computing device or a network of computing devices, which allow a user to interact, play, communicate, share, and learn with the virtual world environment and/or other users. The term "virtual world environment," is used herein to describe a method or apparatus that enable one or more virtual worlds to be provided to a user. Virtual world environments, as described herein, can exist in both public and private networks, such as the internet, World Wide Web, cellular networks, wireless networks, cable television networks, satellite networks, and any other public or private network or device. For example, a virtual world can be provided by software running on one independent device, such as a car game device in an amusement park. In an alternative example, a virtual world can be provided by software running on thousands of computers spread across the Earth linked by a communication networks such as the internet.

In an exemplary embodiment, the virtual world commodity device can grant a user with access to a restricted virtual world environment. Furthermore, the virtual world commodity device can permit the user to gain and associate virtual world commodities with an anonymous user profile associated with the virtual world commodity device. The term "commodity" is used herein to mean anything including a value or for which there is demand. The term "virtual world commodity" is used herein to mean anything within or relating to a virtual world for which there is demand, such as virtual world currency, land, vehicles, property, or other materials.

In an exemplary embodiment, the virtual world commodity device provides a product unique identifier, which can be transmitted via an external device to the virtual world environment in order for the virtual world environment to verify the authenticity of the virtual world commodity device. In an exemplary embodiment, the product unique identifier (PUID) can be unique to the individual virtual world commodity device. In an alternative embodiment, the product unique identifier can be generic to an entire series of virtual world commodity devices. Additionally, in an exemplary embodiment, the product unique identifier can be stored in a virtual world commodity device in a non-human readable format. For example, and not limitation, the product unique identifier could be stored in an encrypted manner on the virtual world commodity device such that it can only be decrypted by an authorized virtual world environment. In this manner, the virtual world commodity device can enable the user to interact with the virtual world environment in an exemplary embodiment without providing any personal or otherwise individual identifying information to the virtual world environment. Thereby, the virtual world environment simply verifies the authenticity of the virtual world commodity device by checking its product unique identifier and does not require any further information.

In an exemplary embodiment, the virtual world commodity device can permit the user to access a restricted virtual world environment and play games, shop, communicate or otherwise interact with the virtual world environment. Furthermore, the user can be permitted to store virtual world commodities obtained through interaction with the virtual world environment on the virtual world commodity device.

In an exemplary embodiment, the user purchases a system providing a virtual world commodity device. The user then enables that virtual world commodity device to communicate with an external device in communication with a virtual world environment. The user then interacts with the virtual world environment and accrues certain commodities, which can be associated with user's anonymous online profile or even downloaded onto the virtual world commodity device. In an exemplary embodiment, when the user reconnects with the virtual world environment, the virtual world environment can recognize the commodities previously associated with the virtual world commodity device and extend the user credit for or permission to use such commodities. Those of skill in the art will appreciate that a virtual world commodity can be stored in a variety of locations, including in a user's anonymous online profile on the virtual world environment server, or a local server, the user's computer, or stored in the memory of the virtual world commodity device or simply represented in the memory of the virtual world commodity device.

In an exemplary embodiment, the virtual world commodity device is enabled to provide four different types of product authentication: (1) new product enrollment, (2) product transfer, (3) lost product reengagement, and (4) continuous product interaction.

New product enrollment authentication in an exemplary embodiment enables a user to initiate a virtual world commodity device in the virtual world environment. In an exemplary embodiment, this authentication ensures that the virtual world commodity device is an authentic product and it further ensures that maintenance of historical interaction data that may have occurred in past experiences such as avatar customization, earned cash and points for the virtual world commodity device. In an exemplary embodiment, this is can be done while the user remains completely anonymous.

For example, and not limitation, when a new virtual world commodity device is purchased, the user can connect the virtual world commodity device to a computer. In this exemplary embodiment, the virtual world commodity device can connect via an external device to an authentication server. The embedded software of the virtual world commodity device in this exemplary embodiment can send a product unique identifier (PUID) that is embedded in the virtual world commodity device to the authentication server. The authentication server in this exemplary embodiment can then make a database request to verify the validity of the product unique identifier. If the product unique identifier is determined to be a valid, then in this exemplary embodiment the authentication server can generate a globally unique identifier (GUID) to identify the virtual world commodity device in the virtual world environment. This globally unique identifier enables a user to create an online profile for gathering virtual world commodities without every providing any personal information regarding the user to the virtual world environment. In this exemplary embodiment, the globally unique identifier can be sent to and stored in memory on the virtual world commodity device. Furthermore, the authentication sever of the virtual world environment can store the globally unique identifier in association with the product unique identifier. In an exemplary embodiment, the user is asked to create an anonymous user profile or register the virtual world commodity device within an existing anonymous user profile. Thus, any virtual world commodities gained by the user for a particular virtual world commodity device or set of virtual world commodity devices can be associated with the anonymous user profile.

Product transfer enables a user to transfer, sell or trade one of their virtual world commodity devices. In an exemplary embodiment, once a virtual world commodity device has been authenticated by the virtual world environment, it will be associated with a user's anonymous user profile. If the user desires to transfer the virtual world environment to another user in an exemplary embodiment, the user can mark the virtual world commodity device as a "foster" device within the user's anonymous user profile. After the virtual world commodity device has been marked "foster" in an exemplary embodiment, it can be detached from an existing anonymous user profile thus making the virtual world commodity device transferable to another user. In an exemplary embodiment, it will then be possible to transfer the "fostered" virtual world commodity device to another user. When the new user receives the "fostered" virtual world commodity device, the user will be enabled in an exemplary embodiment to connect the virtual world commodity device to the authentication server of the virtual world environment. In an exemplary embodiment, the authentication server can request details from the product unique identifier sever and view the virtual world commodity device as a fostered product. In an exemplary embodiment, the virtual world environment can request the user to choose to either create a new anonymous user profile or assign the virtual world commodity device to an existing anonymous user profile making the virtual world commodity device once again assigned and active. Depending upon the type of transfer, the transferring user can choose whether to transfer the virtual world commodities associated with the virtual world commodity device to the receiving user.

An exemplary embodiment of the virtual world environment enables a user to complete lost product reengagement. In this exemplary embodiment, if a user looses a virtual world commodity device, its memory component, or if the virtual world commodity device becomes defective, then the user will be able to purchase a new memory component for the virtual world commodity device. Once the blank memory component for the virtual world commodity device is purchased, in an exemplary embodiment the user will be able to connect the memory component to the virtual world environment. The authentication server in an exemplary embodiment can receive the product unique identifier associated with the memory component and verify that product unique identifier against the database. The user can then assign the new memory component, in an exemplary embodiment, to the existing profile for the lost virtual world commodity device in their existing anonymous user profile. Once the user makes an assignment to an existing anonymous user profile in an exemplary embodiment, the globally unique identifier associated with that profile can be downloaded to the new memory component. In an exemplary embodiment, the old or lost virtual world commodity device can be rendered useless.

An exemplary embodiment of the virtual world environment can enable continuous product interaction for the user. For example, and not limitation, once a user has a registered virtual world commodity device they can connect it to a virtual world environment. The virtual world environment can provide software in an exemplary embodiment that executes when connected to a computer that transmits the product unique identifier of the virtual world commodity device to the virtual world environment authentication server. The authentication server can access the product unique identifier database and retrieve the globally unique identifier and compare it to the one previously stored on the virtual world commodity device. Once both the product unique identifier and the globally unique identifier are verified, the authentication server in an exemplary embodiment can request product data from the anonymous user profile database and load the virtual world commodity device with a globally unique identifier associate with the necessary data values and attributes. During continuous game play in an exemplary embodiment, the changes to a user's interaction with the virtual world commodity device will be stored in the anonymous user profile database upon exiting the virtual world environment.

In an exemplary embodiment, the virtual world commodity device is an independent object. In an alternative embodiment, the virtual world commodity device is incorporated into a larger system, such as a toy housing. Those of skill in the art will appreciate that the virtual world commodity device can be enabled to communicate with an external device via a variety of communication links. For example, and not limitation, in the embodiment in which the virtual world commodity device is contained within a larger system, the virtual world commodity device can be enabled to communicate with the external device over a wireless link, using a wireless protocol such as WiFi, Bluetooth®, or other wireless communication standard. Alternatively, the virtual world commodity device can be enabled to communicate with an external device over a physical link. For example, and not limitation, the virtual world commodity device can provide a Universal Serial Bus ("USB") interface which can be connected to a mating USB interface on an external device. In this non-limiting example, the external device can be a personal computer enabled to communicate with the USB enabled virtual world commodity device and thereby permit a user to interact with a virtual world environment.

Figure 2:
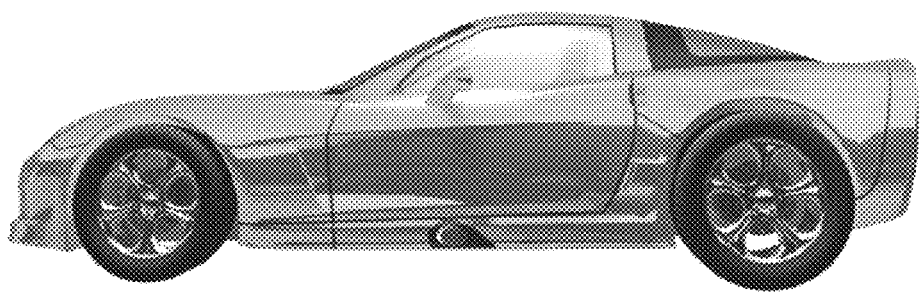

FIGS. 1 and 2 provide a perspective view of a sports car toy system 100 in accordance with an exemplary embodiment of the present invention. The sports car toy system 100 shown in FIG. 1 is an exemplary embodiment in which the sports car toy system 100 resembles a realistic sports car. In an exemplary embodiment, the sports car toy system 100 can be constructed from a hard injection molded plastic. Additionally, the sports car toy system 100 can provide life-like tires that are made from real rubber. In an exemplary embodiment, the sports car toy system 100 can be connected by a steel rod running through plastic molded guides located in the body of the car, two on the front side and two on the back side. In the embodiment, the sports car toy system 100 can be enabled to have rotating wheels; thus, allowing the user to roll the car on the floor while playing with it. In one embodiment, the wheels are molded out of metal and allow the tires to be taken off and popped back on. This gives the user the ability to purchase different tires and wheels that may be interchanged on the sports car toy system 100. The windows of the sports car toy system 100 in an exemplary embodiment can be made from clear plastic so that the user may see the details within the car's interior. The covers to the headlights can also be made from clear plastic. In an exemplary embodiment, the user can be enabled to open both doors along with the hood on the sports car toy system 100 in order to view the insides. The paint job and color of the sports car toy system 100 can be provided to represent a factory finish and color. Therefore, the sports car toy system 100 can be provided as a scaled down replica of the real thing.

Figure 3:
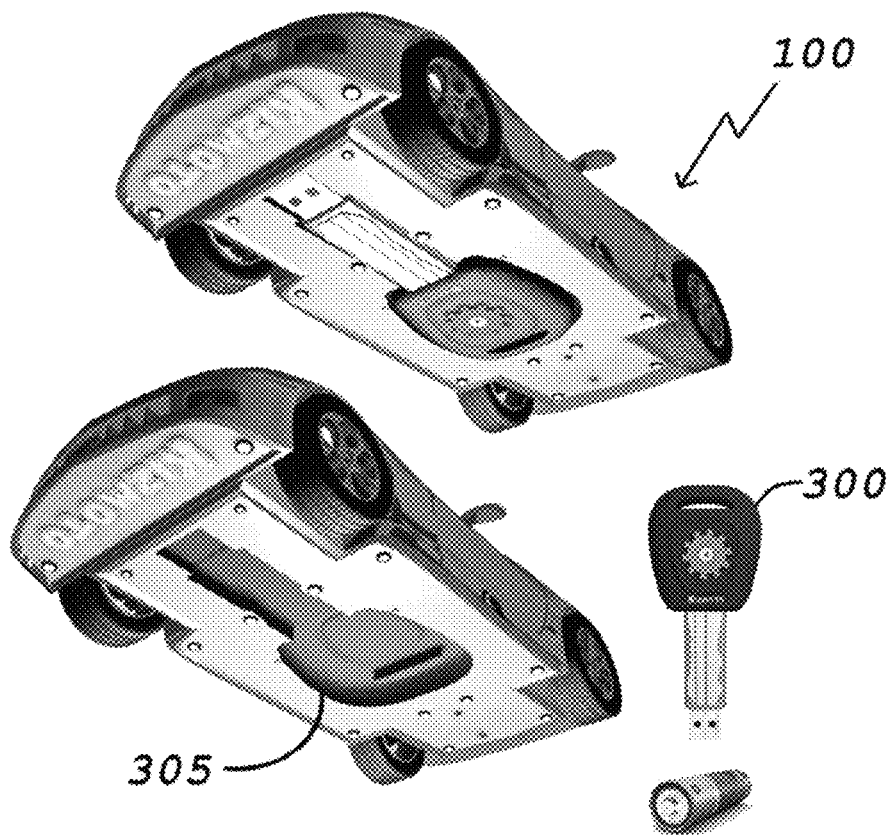
FIG. 3 shows a perspective view of the bottom of the sports car toy system 100. In an exemplary embodiment, the underside of the sports car toy system 100 can be molded from a hard injection molded plastic.

FIG. 3 shows a perspective view of the bottom of the sports car toy system 100. In an exemplary embodiment, the underside of the sports car toy system 100 can be molded from a hard injection molded plastic. In an exemplary embodiment, bottom of the sports car toy system 100 can provide a receiving cavity 305 for a virtual world commodity device 300. More particularly, the exemplary embodiment can provide a receiving cavity 305 that is the reverse image of the virtual world commodity device 300. The receiving cavity 305 can provide two protruding plastic nubs that will allow the virtual world commodity device 300 to fit snugly without falling out when the sports car toy system 100 is played with or picked up. In an exemplary embodiment, a slight indentation is provided within the receiving cavity 305 near the top of the virtual world commodity device 300. This will allow the user to press on the top of the virtual world commodity device 300, when it is stored in the receiving cavity 305, causing the virtual world commodity device 300 to pop up so that it may be removed from the receiving cavity 305.

In the exemplary embodiment depicted in FIG. 3, the virtual world commodity device 300 is configured to emulate the shape of a car key. As shown in FIG. 3, the virtual world commodity device 300 can provide a rubberized head, with the lower portion configured to resemble a key. The virtual world commodity device 300 in an exemplary embodiment of the present invention can be enabled to interface with a computer or other device. In an exemplary embodiment, the virtual world commodity device 300 can provide a USB device. Therefore, the end of the key portion of the exemplary embodiment of the virtual world commodity device 300 shown in FIG. 3 can be configured with a USB interface.

In the exemplary embodiment shown in FIG. 3, the virtual world commodity device 300 can be a representation of a real key. It can have a rubberized head connected to a shank with a USB connector on the end of it. The head of the virtual world commodity device 300 can have an opening on it so that the user may put it on a key ring or necklace. The graphics on the key can be relevant to the toy car that it to which it belongs. For example if the sports car toy system 100 is a certain type of car, then the virtual world commodity device 300 can have the Kizmoto icon on one side and the car branding on the other side. The virtual world commodity device 300 can also contain the Kiz Toys logo. The neck of the virtual world commodity device 300 can have a graphic on both sides representing a real metal cut key.

The virtual world commodity device 300 can have an integrated memory chip on it that can contain an encrypted product unique identifier that can be decrypted by the authentication server of a virtual world environment upon communication with the virtual world environment. This memory chip can also contain data relevant to the sports car toy system 100 along with the past game play and interaction with both the virtual toy and virtual playgrounds. The data stored on the virtual world commodity device 300 can be both real time and static.

In the exemplary embodiment depicted in FIG. 3, if the user wishes to access a virtual world environment with the virtual world commodity device 300, then they can first turn the sports car toy system 100 over to expose the bottom. One it is flipped over, the user can press down on the head of the virtual world commodity device 300. This can cause the neck to popup away from the platform giving the user the ability to grab the key by the neck and remove it from the base. Once user obtains the virtual world commodity device 300, they will be able to plug it a USB port on a computer or a USB hub connected to a computer. They may also choose to purchase and utilize the Kizmoto USB hub sold by Kiz Toys for this purpose. After the virtual world commodity device 300 has been connected to a computer, in an exemplary embodiment, the virtual world commodity device 300 is configured to automatically begin the authentication process with the virtual world environment.

In an exemplary embodiment, the virtual world commodity device 300 can be removed from the sports car toy system 100 and connected to a USB port on a computer. Once the virtual world commodity device 300 is connected to the USB port on a computer, the user can connect to a virtual world environment. The virtual world environment can provide a variety of different products and services to the user, which are related or unrelated to the toy system 100. In an exemplary embodiment, the virtual world environment can provide a virtual world in which a virtual representation of the sports car toy system 100 can be manipulated by user. More particularly, in one embodiment the user can be permitted to access a game in the virtual world environment in which the user can race a virtual representation of the user's sports car toy system 100 against other user's of the virtual world environment. In this embodiment, the user can see a virtual representation of his or her sports car toy system 100 in the game of the virtual world environment. Furthermore, in an exemplary embodiment, the user can be permitted to add certain accessories, like new tires, a bigger engine, or other features, to his or her virtual representation of the sports car toy system 100. In an exemplary embodiment, these added features may improve the performance of the virtual representation of the sports car toy system 100 in the virtual world environment.

On some models of the sports car toy system 100, the underside can also have integrated wireless technologies, such as Bluetooth® or WiFi. In an exemplary embodiment of the sports car toy system 100 having wireless capability, the virtual world commodity device 300 can be provided within the toy housing and an activation button can be provided on the sports car toy system 100 to engage communication with the virtual world commodity device 300 and an external device. The sports car toy system 100 car also has a battery door allowing access to the battery compartment that can house a standard battery. This door can be a made from a solid piece of plastic with an inset nub that slides in and under the base of the underside along with a flexible latch that will bend to allow the compartment door to open and snap shut.

Figure 4:
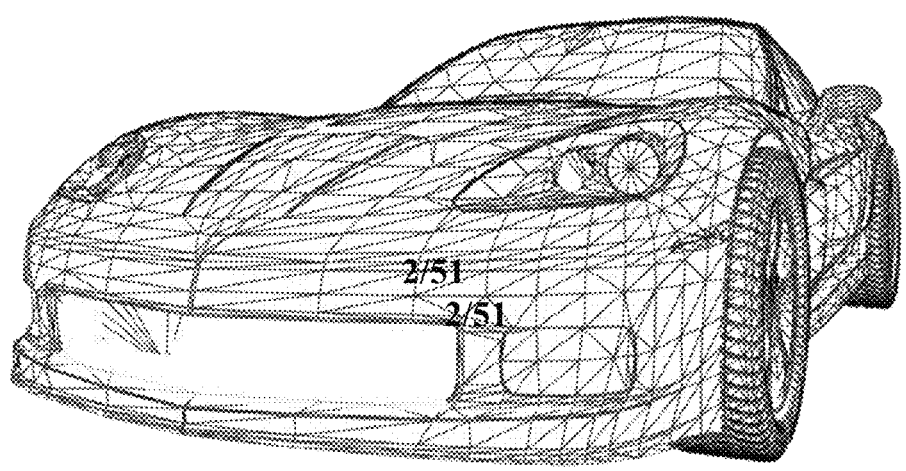
FIGS. 4 and 5 show a three dimensional wireframe drawing of the front and side view of a an exemplary embodiment of the sports car toy system 100.
Figure 5:
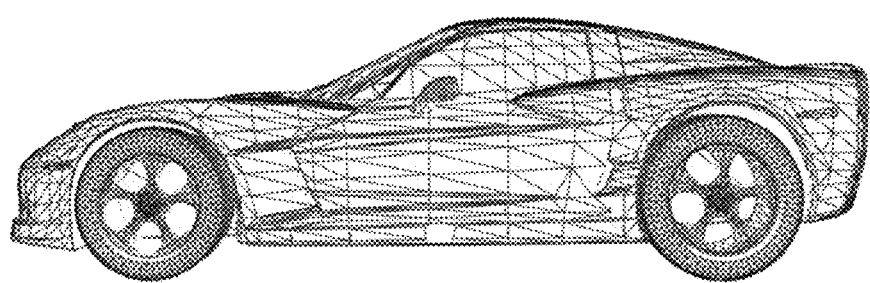

FIGS. 4 and 5 show a three dimensional wireframe drawing of the front and side view of a an exemplary embodiment of the sports car toy system 100. These views allow you to get a better understanding of the overall shape of exemplary embodiment of the physical and virtual sports car toy system 100.

Figure 6:
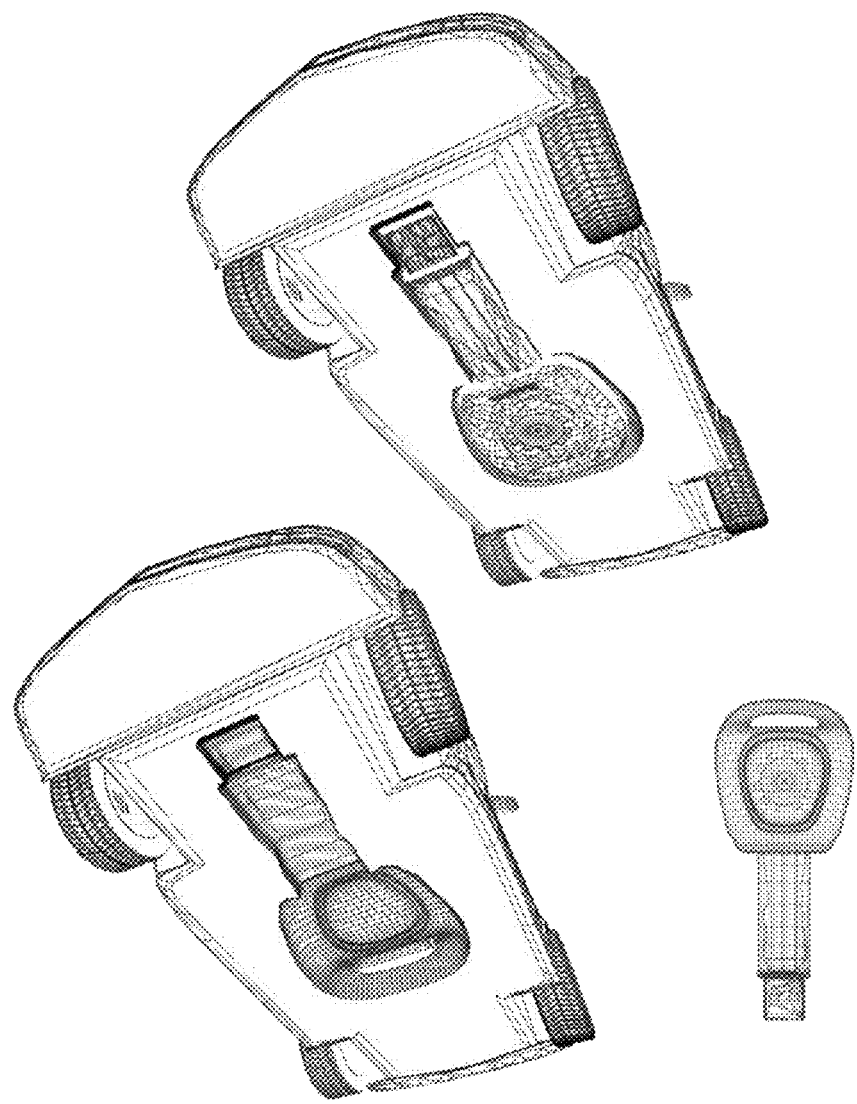
FIG. 6 shows a three dimensional wireframe drawing of the underside of an exemplary embodiment of the sports car toy system 100.

FIG. 6 shows a three dimensional wireframe drawing of the underside of an exemplary embodiment of the sports car toy system 100. This allows you to see the cavity that holds the virtual world commodity device 300 along with the pop out indentation and nubs used for holding the virtual world commodity device 300.

Figure 7:
FIGS. 7 and 8 show a detailed front and side views of Max, a Kiz Pal action figure toy system 100 in accordance with an exemplary embodiment of the present invention.
Figure 8:
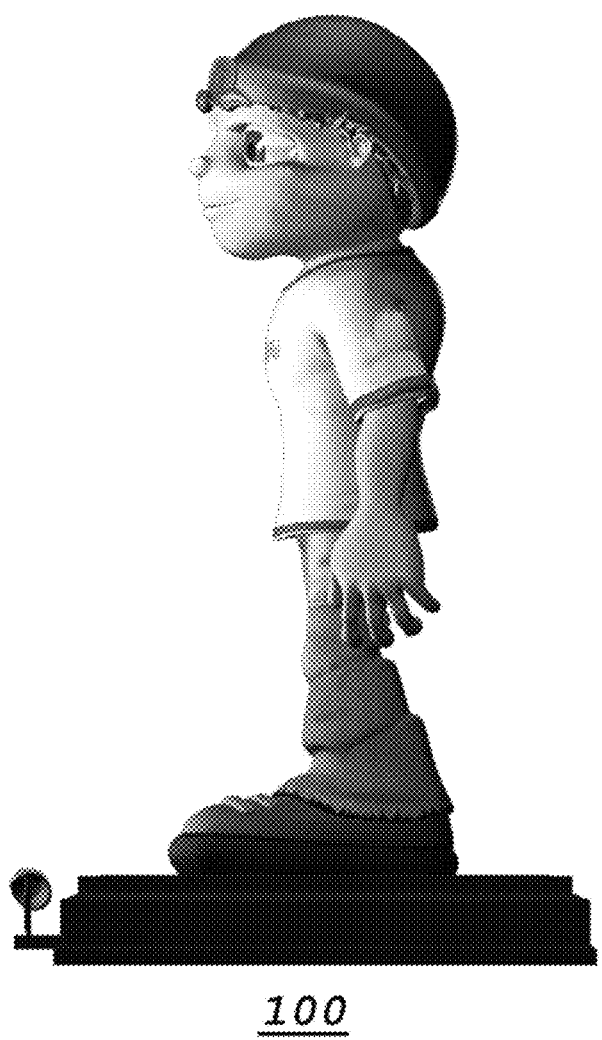

FIGS. 7 and 8 show a detailed front and side views of Max, a Kiz Pal action figure toy system 100 in accordance with an exemplary embodiment of the present invention. The Kiz Pal action figure toy system 100 can be provided as various different types of toys or figurines, in addition to the exemplary embodiment depicted in FIGS. 7 and 8.

In an exemplary embodiment, the Kiz Pal action figure toy system 100 can be Mobile Action Figure. For this exemplary embodiment, a user is enabled to remove the body of the action figure toy system 100 from a base unit in order to more intimately play with the Kiz Pal action figure. In this manner, the user can manipulate the Kiz Pal action figure and enable the Kiz Pal action figure to ride on, or in, or otherwise interact with other toys. In an alternative embodiment, the Kiz Pal action figure toy system 100 can be a Fixed Action Figure. The Fixed Action Figure can act as a collectable item and can be displayed on a shelf.

In an exemplary embodiment the Mobile Action Figure embodiment of the Kiz Pal action figure toy system 100 can be constructed of a soft pliable plastic. Additionally, the clothes of the Mobile Action Figure embodiment of the Kiz Pal action figure toy system 100 can be made from real fabric so that they may be removed from the action figure in order to be redressed in different outfits or uniforms. This allows additional clothes to be sold so that the user will be able to change both the physical and virtual appearance of the action figure. Given that the Mobile Action Figure body can be made from a pliable plastic, the user can have the ability to move and reposition the arms, legs along with the feet of the action figure. The head can also allow for movement due to its internal connectors between the neck and the body. The base or platform of the action figure can made from a hard plastic injection molding process. Two integrated plastic pegs can protrude from the top of the base that insert into the left and right shoes enabling the Mobile Action Figure to be removed from the platform and played with and later repositioned on the platform for storage and display purposes.

In an alternative embodiment, the Fixed Action Figure Kiz Pal action figure toy system 100 can be constructed of a hard plastic. This action figure can be made from one solid mold with the exception of a hollowed out platform that will contain the necessary electronics. The Fixed Action Figure Kiz Pal action figure toy system 100 can be manufactured and detailed in full color in order to better represent the virtual toy. The body can be fixed to the base and the body parts are not able to move. In an exemplary embodiment, this action figure can be strictly designed to be displayed on a shelf as a collectable.

Both types of action figures can be modeled as a close representation of the virtual toy that the user can utilize during virtual world game play and interaction within a virtual playground in a virtual world environment. An example of this would be if the virtual toy has brown hair, then the action figure can have similar hair color. In an exemplary embodiment, the platform on both models can have the Kiz Pal logo along with the name of the action figure. The virtual action figure can have the same name, but the clothes may vary depending on how the user dresses it both physically and virtually.

Figure 9:
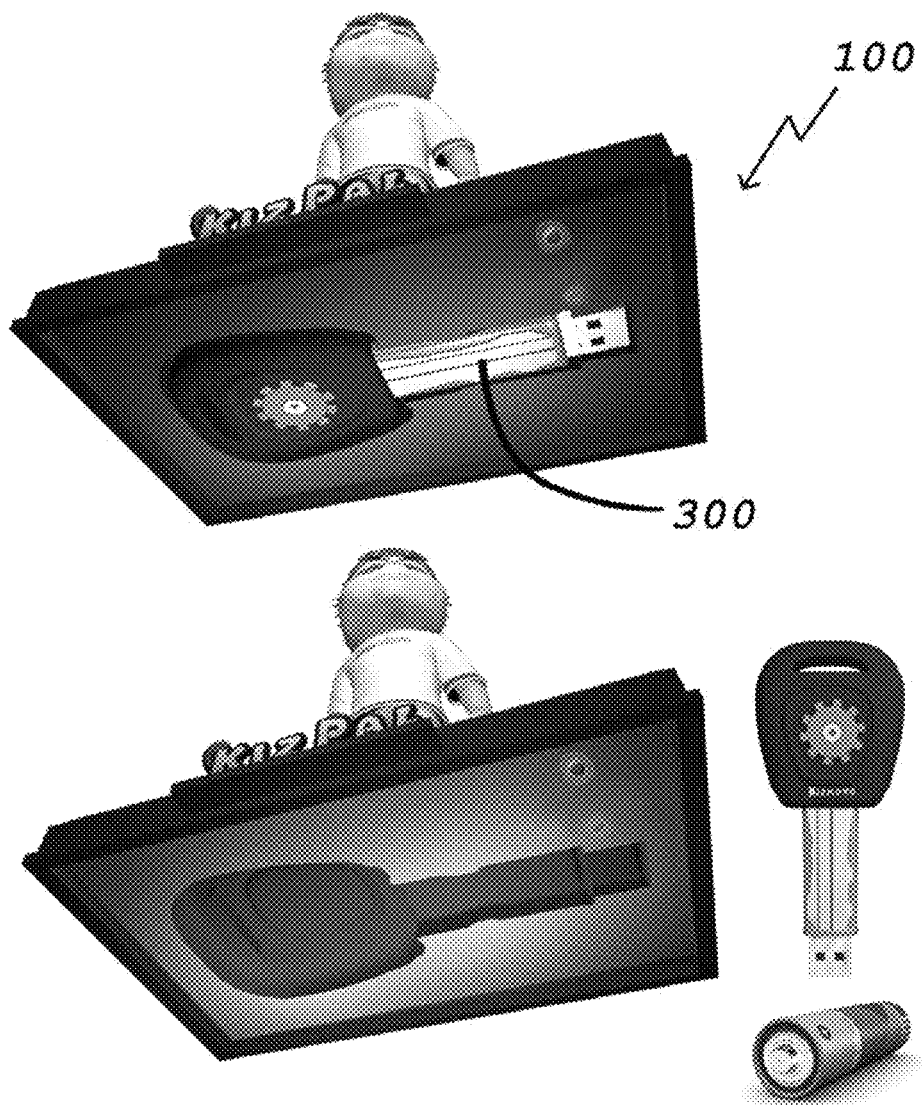
FIG. 9 shows the underside of the Kiz Pal action figure toy system 100's platform.

FIG. 9 shows the underside of the Kiz Pal action figure toy system 100's platform. The bottom of the platform can contain a virtual world commodity device 300 located in the center of the platform. The platform has an embedded cut out or cavity that can be a reverse image of the virtual world commodity device 300. This cavity can have two protruding plastic nubs running along the neck of the virtual world commodity device 300 that can allow the virtual world commodity device 300 to fit snugly without falling out when the Kiz Pal action figure toy system 100 is picked up. There can also be, as shown in FIG. 9, a slight indentation within the cavity near the head of the virtual world commodity device 300. In an exemplary embodiment, this will allow the user to press on the top of the virtual world commodity device 300, when it is stored in the base, causing the USB end of the virtual world commodity device 300 to pop up so that it may be removed from the platform.

In some embodiments, the Kiz Pal action figure toy system 100 can also have integrated wireless technologies, such as Bluetooth® or WiFi. A wireless embodiment of the Kiz Pal action figure toy system 100 can provide a wireless activation button and light related to the particular technology. The wireless Kiz Pal action figure toy system 100 can have a battery door allowing access to the battery compartment that houses a standard battery. This door can be made from a solid piece of plastic with an inset nub that slides in and under the base of the platform along with a flexible latch that will bend to allow the compartment door to open and snap shut.

In an exemplary embodiment, the user can activate the wireless technology on the Kiz Pal action figure toy system 100 to connect to a remote network, such as a wireless network in a home or other network. In an exemplary embodiment, the virtual world commodity device 300 can be configured to automatically connect to a virtual world environment once it has established a valid network connection. Alternatively, the virtual world commodity device 300 can automatically detect when a wireless network is proximate to the device 300 and automatically request access to the wireless network.

Figure 10:
FIGS. 10 and 11 show a three dimensional wireframe drawing of the front and side view of Kiz Pal action figure toy system 100 in an exemplary embodiment.
Figure 11:
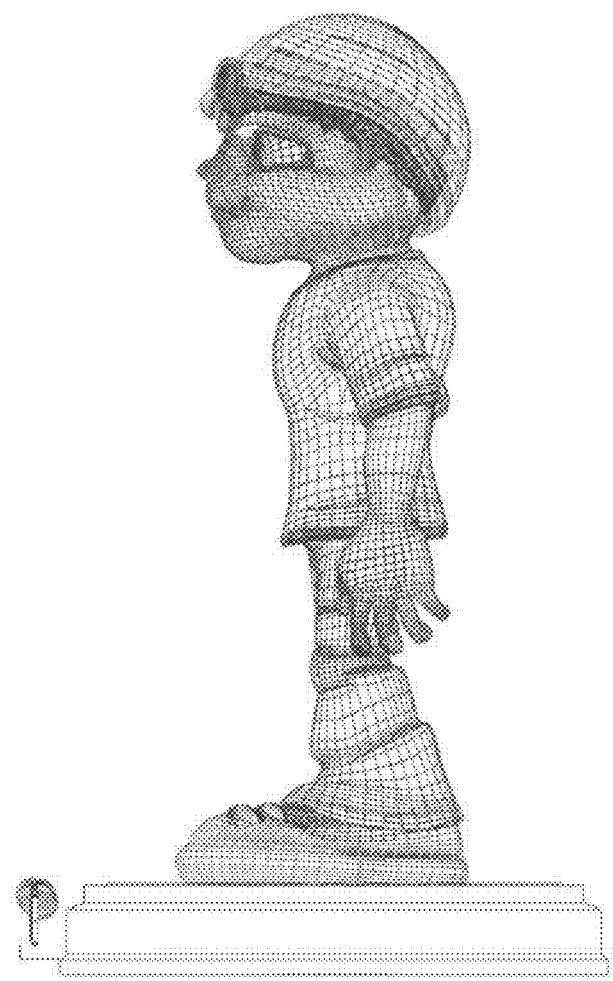

FIGS. 10 and 11 show a three dimensional wireframe drawing of the front and side view of Kiz Pal action figure toy system 100 in an exemplary embodiment. The front view in FIG. 10 illustrates the details of the various fabrics in an exemplary embodiment of the Kiz Pal action figure toy system 100. Additionally, FIG. 10 illustrates that the platform can be flat so that labeling can be applied representing the action figure. The side view in FIG. 11 illustrates that an exemplary embodiment of the Kiz Pal action figure toy system 100 can have intricate details, such as eyebrows and fingers.

Figure 12:
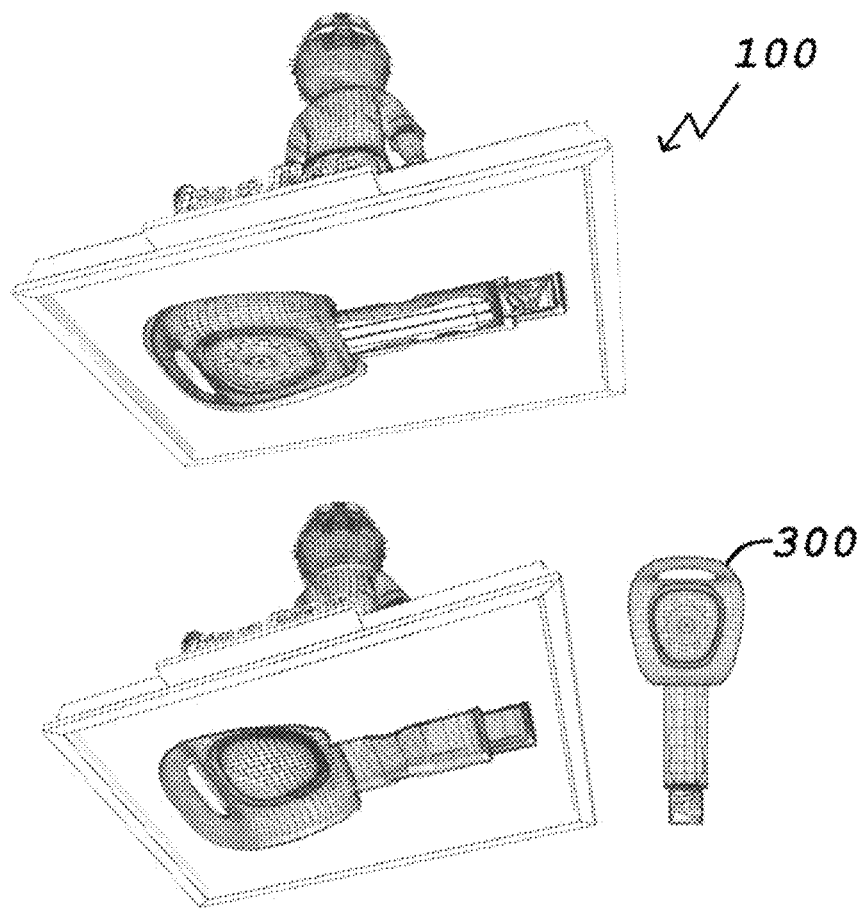
FIG. 12 shows a three dimensional wireframe drawing of the underside of the Kiz Pal action figure toy system 100 in an exemplary embodiment.

FIG. 12 shows a three dimensional wireframe drawing of the underside of the Kiz Pal action figure toy system 100 in an exemplary embodiment. This illustrates the cavity that holds the virtual world commodity device 300 along with the pop out indentation and nubs used for holding the virtual world commodity device. FIG. 12 also illustrates the depth of the Kiz Pal logo and how it can be connected to the action figure.

Figure 13:
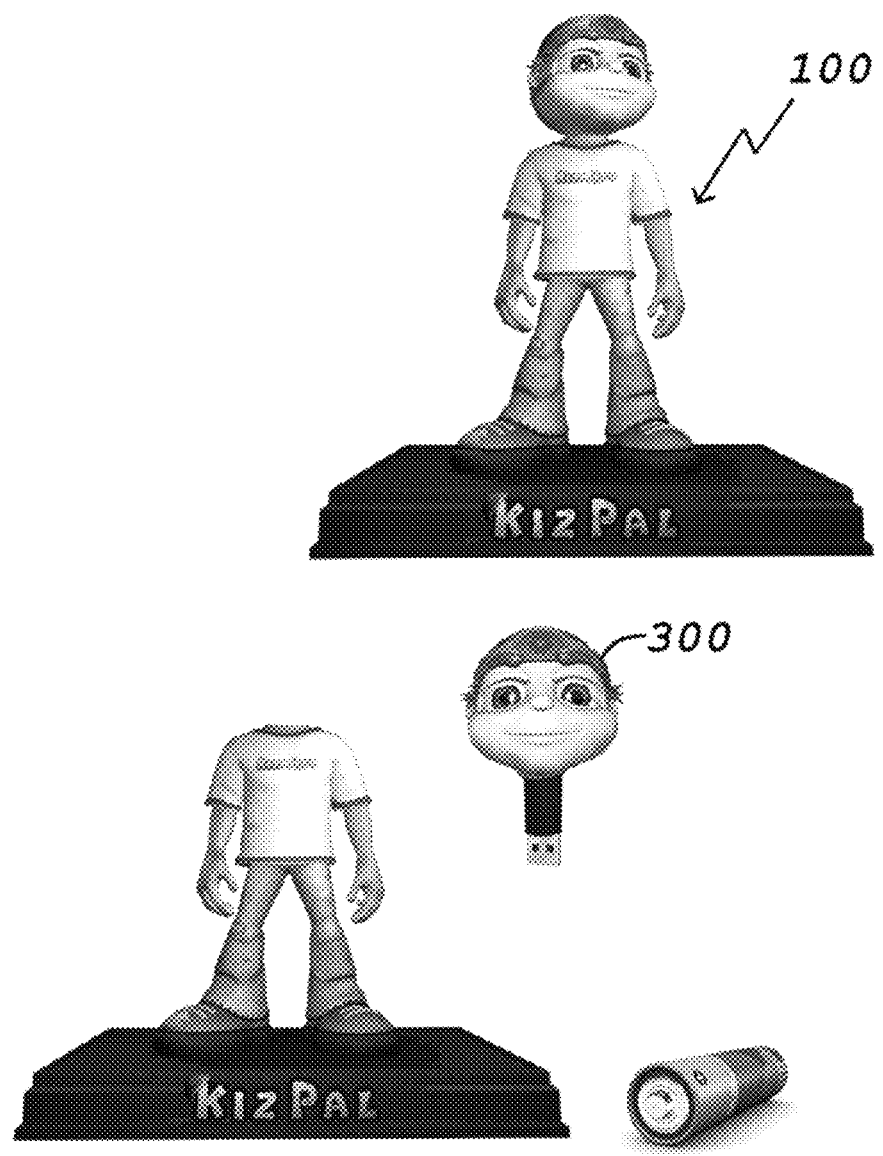
FIG. 13 illustrates an alternate embodiment of the integration of the virtual world commodity device 300 into the Kiz Pal action figure toy system 100.

FIG. 13 illustrates an alternate embodiment of the integration of the virtual world commodity device 300 into the Kiz Pal action figure toy system 100. In this embodiment, the head of the Kiz Pal action figure toy system 100 can be removed to reveal the virtual world commodity device 300. In this exemplary embodiment, the entire head can be plugged directly into a USB port or the virtual world commodity device 300 can be completely removed from the head of the Kiz Pal action figure toy system 100. This action figure model can have four separate parts: the head, the virtual world commodity device 300, the body, and the platform. The body of the Kiz Pal action figure toy system 100 can have a hollowed out area in the chest region. The head of the Kiz Pal action figure toy system 100 can also have a hollowed out area. Both the head and body can have embedded plastic nubs located inside the hollowed out regions that put pressure on the virtual world commodity device 300 when inserted. This can assist in prevent the virtual world commodity device 300 from falling out as well as keeping the head and body together when the virtual world commodity device 300 is inserted. The virtual world commodity device 300 can have two small indentations, one on each side, in order to allow the integrated nubs in the hollowed out head and body to slide onto them tightly. This creates a "double" security measure for keeping the head and body connected to the inserted virtual world commodity device 300. All other connectivity features can function in the same matter as the Kiz Pal action figure toy system 100 with the removable virtual world commodity device 300 stored in the bottom of the platform.

Figure 14:
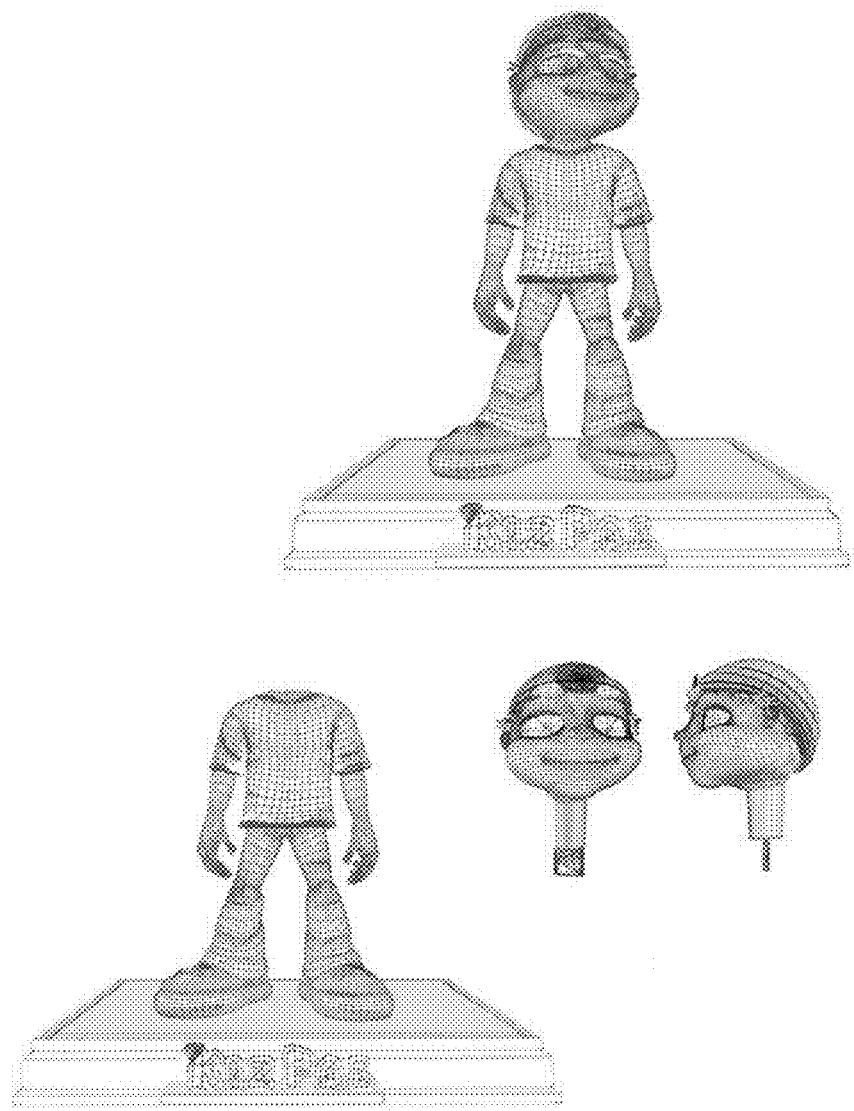
FIG. 14 shows a three dimensional wireframe drawing of the alternate version of the Kiz Pal action figure toy system's 100 virtual world commodity device 300 integration.

FIG. 14 shows a three dimensional wireframe drawing of the alternate version of the Kiz Pal action figure toy system's 100 virtual world commodity device 300 integration. The side view of the head illustrates that the integrated virtual world commodity device 300 has a round shaped body. This can permit it to double as the neck of the Kiz Pal action figure toy system 100, while at the same time staying hidden from the user's view. The virtual world commodity device 300 can expand upward into the head. This can provide stability. Internal nubs or pressure points, in both the hollowed out head and body can provide the necessary support to keep the pieces tightly together.

Figure 15:
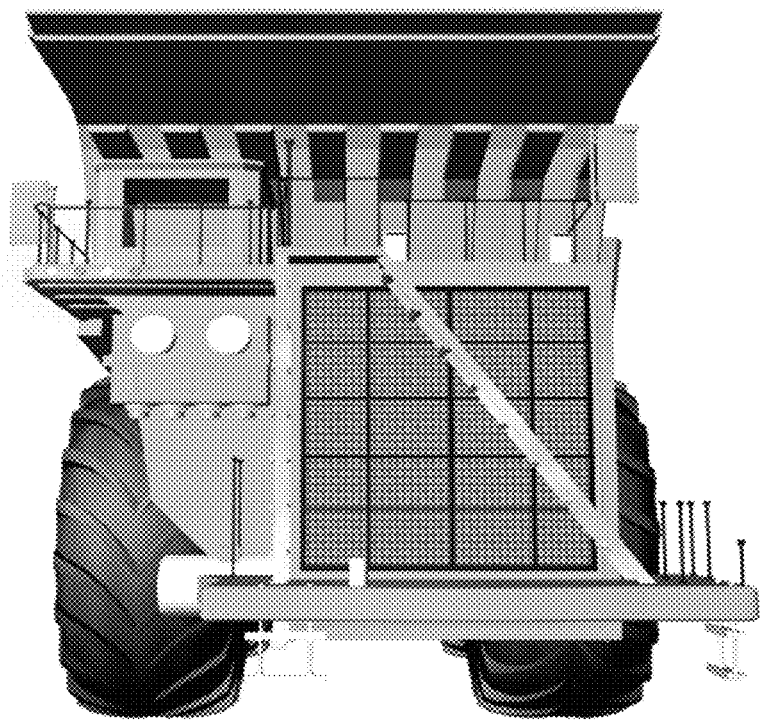
FIGS. 15 and 16 illustrate front and side views of a truck toy system 100 in accordance with an exemplary embodiment of the present invention.
Figure 16:
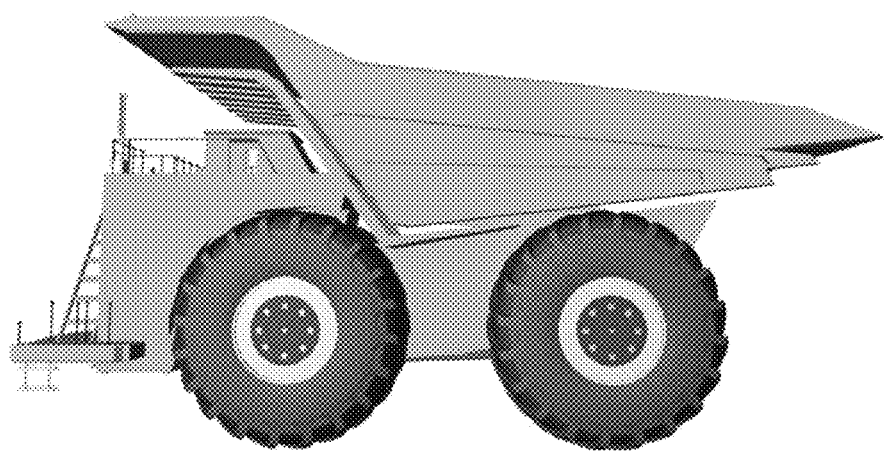

FIGS. 15 and 16 illustrate front and side views of a truck toy system 100 in accordance with an exemplary embodiment of the present invention. The truck toy system 100 represents yet another variation of the system in accordance with the present invention that provides a virtual world commodity device 300. In an exemplary embodiment, the body of the truck toy system 100 can be constructed from a hard injection molded plastic. In an exemplary embodiment, the tires can be made from real rubber and can be connected by a steel rod running through plastic molded guides located in the body of the truck toy system 100, two on the front side and two on the back side. In an exemplary embodiment, this can permit the wheels to rotate; thus, allowing the user to roll the truck toy system 100 on the floor. The wheels of an exemplary embodiment of the truck toy system 100 can be molded out of metal to permit the tires to be taken off and popped back on. This can permit the user to purchase different tires and wheels that may be interchanged on the truck toy system 100. In an exemplary embodiment, the truck toy system 100 can provide truck features, such as the ability dump the bucket on the dump truck by lifting it up. It can swing on its internal hinge located in the lower back section of the bucket and dump truck toy system 100. The bucket can snap into the frame of the dump truck toy system 100 by intersecting two protruding pegs attached to the bucket and two half c-shape clips attached to the dump truck's body. In an exemplary embodiment, the color of the truck toy system 100 can represent a real factory color. In an exemplary embodiment, the overall truck toy system 100 can be a scaled down replica of an actual truck.

Figure 17:
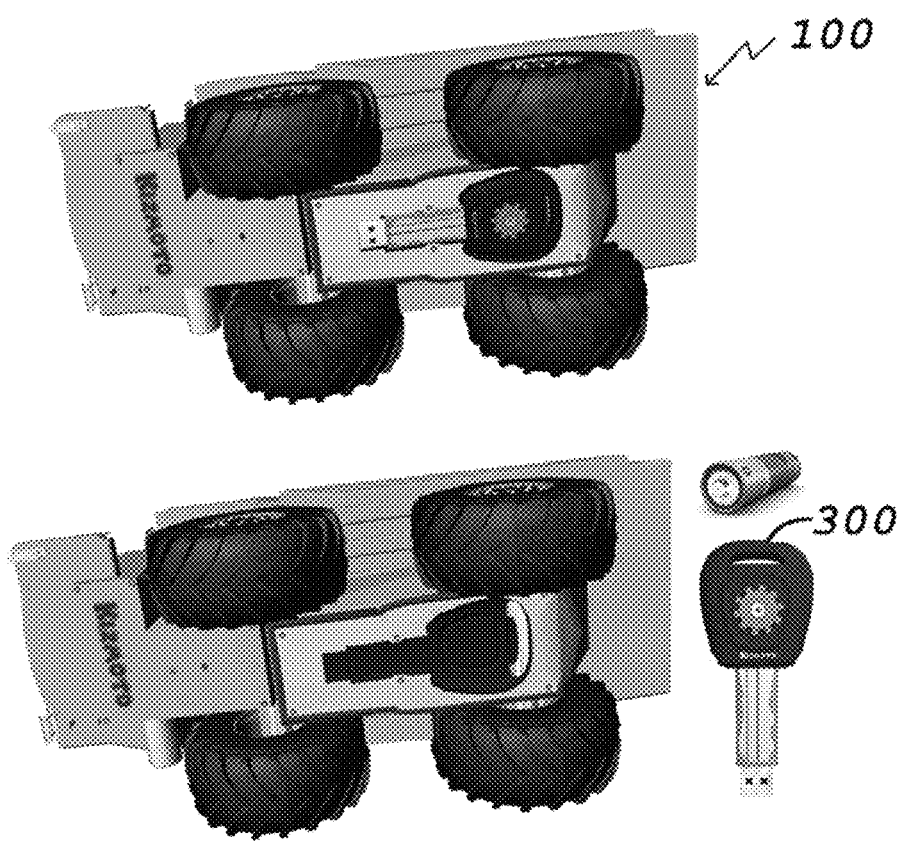
FIG. 17 illustrates the underside of the truck toy system 100 in accordance an exemplary embodiment of the present invention.

FIG. 17 illustrates the underside of the truck toy system 100 in accordance an exemplary embodiment of the present invention. The underside of the truck toy system 100 in an exemplary embodiment can be molded from a hard injection molded plastic just like the top. The underside can contain the virtual world commodity device 300. In an exemplary embodiment, the virtual world commodity device 300 of the truck toy system 100 provides a USB port. The user can be enabled in this exemplary embodiment to remove the virtual world commodity device 300 from the truck toy system 100 and insert it into the USB port of an external device, such as a personal computer. Once connected to the personal computer, the virtual world commodity device 300 of an exemplary embodiment can enable the user to connect to a restricted virtual world environment. In one embodiment, the virtual world environment can verify the authenticity of the virtual world commodity device 300 by comparing a product unique identifier supplied by and stored on the virtual world commodity device 300 with a lookup table. Once the authenticity of the virtual world commodity device 300 has been verified, the user can be permitted to access the restricted virtual world environment in an exemplary embodiment. In an exemplary embodiment, the restricted virtual world environment can provide the user with games to play. In one embodiment, the user can be enabled to play a game involving a virtual representation of the truck toy system 100. In the game of this exemplary embodiment, the user could be enabled to use the virtual representation of the truck toy system 100 to operate on a virtual job site, moving and dumping loads of dirt or materials. Furthermore, the user can be enabled in an exemplary embodiment of the virtual world environment to purchase certain components or accessories for the truck toy system 100. For example, the user could buy petroleum to run the virtual representation of the truck toy system 100 or new tires for the truck toy system 100.

In accordance with an exemplary embodiment of the present invention, the user can be enabled to store commodities purchased or obtained in the virtual world environment for the truck toy system 100 on the virtual world commodity device 300. In an exemplary embodiment, the virtual world commodity device 300 is enabled to be associated with a anonymous user profile in the virtual world environment containing one or more virtual world commodities associated with the virtual world commodity device. Thereby, in a non-limiting example, the virtual world environment can maintain a profile representing the commodities obtained by the user for the truck toy system 100 in the virtual world commodity device 300. On a later date, the user could reinsert the virtual world commodity device 300 into the same or another personal computer and regain access to the virtual world environment. Once access had been gained, the virtual world environment could provide the user with credit for the previously obtained virtual world commodities by accessing the anonymous user profile associated with the virtual world commodity device 300. Therefore, in a non-limiting example, when the user regains access to his or her virtual representation of their truck toy system 100, it can have the previous components, such as a full tank of gas or new tires, associated with it.

Those of skill in the art will appreciate that the virtual world commodity device provides numerous benefits and advantages to the user. Significantly, the virtual world commodity device enables the user to gain access to restricted virtual world environment without providing any personal information. In fact, in an exemplary embodiment the user can gain access to restricted virtual world environment without providing any information or data which can particularly identify the user's particular virtual world commodity device 300 or the user's particular toy system 100. Therefore, in an exemplary embodiment the virtual world environment is completely unaware of the identity of the user of the virtual world commodity device 300 or the identity of the specific virtual world commodity device 300.

Figure 18:
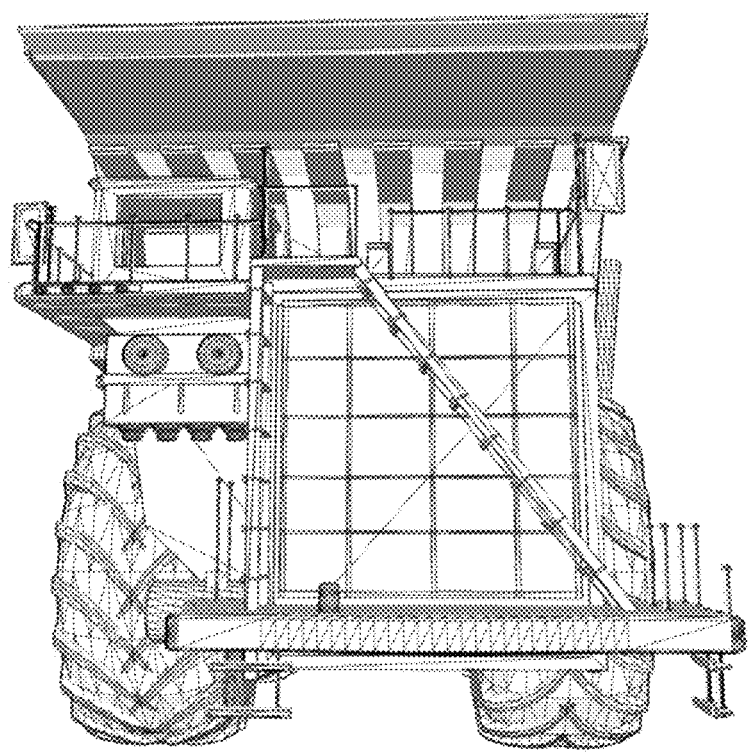
FIGS. 18 and 19 show a three dimensional wireframe drawing of the front and side view of a truck toy system 100 in accordance with an exemplary embodiment of the present invention.
Figure 19:
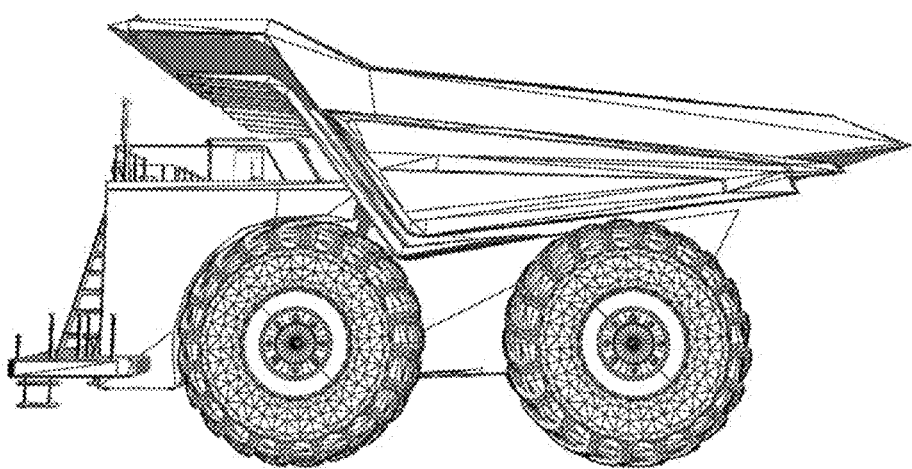

FIGS. 18 and 19 show a three dimensional wireframe drawing of the front and side view of a truck toy system 100 in accordance with an exemplary embodiment of the present invention. FIGS. 18 and 19 illustrate that intricate details and life-like features of the truck toy system 100 in an exemplary embodiment.

Figure 20:
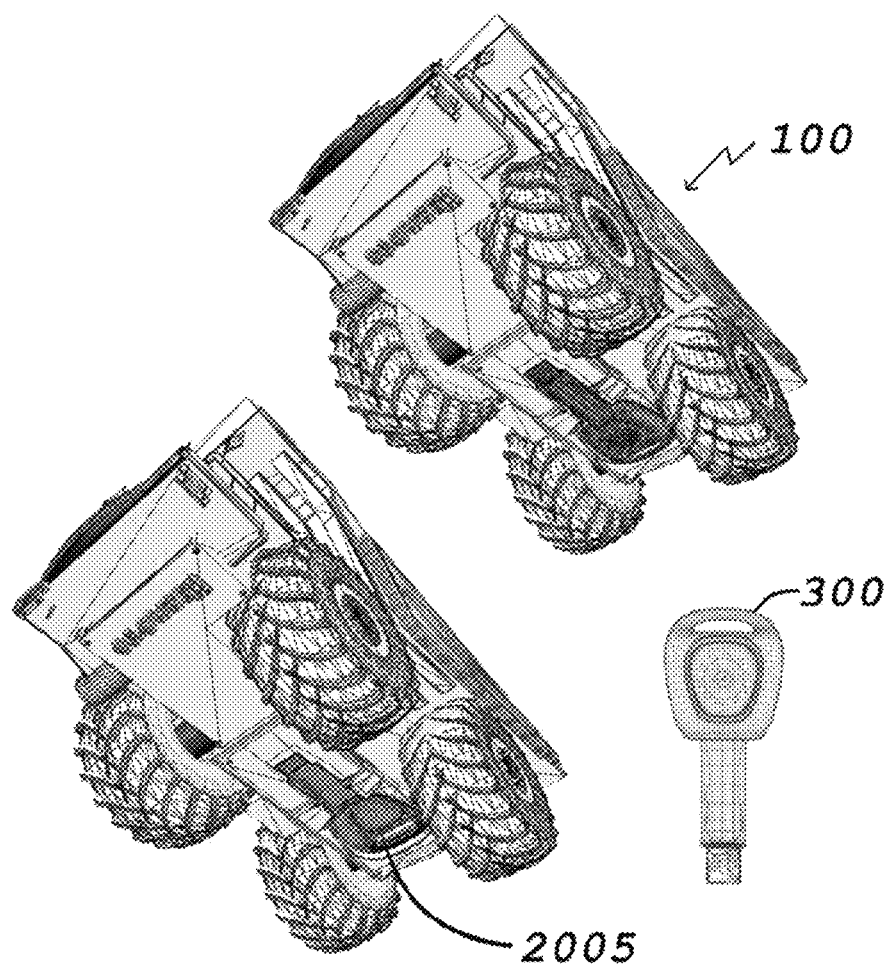
FIG. 20 shows a three dimensional wireframe drawing of the underside of a truck toy system 100 in accordance with an exemplary embodiment of the present invention.

FIG. 20 shows a three dimensional wireframe drawing of the underside of a truck toy system 100 in accordance with an exemplary embodiment of the present invention. In the exemplary embodiment depicted in FIG. 20, the virtual world commodity device 300 can be stowed in a cavity 2005 in the underside of the truck toy system 100.

Figure 21:
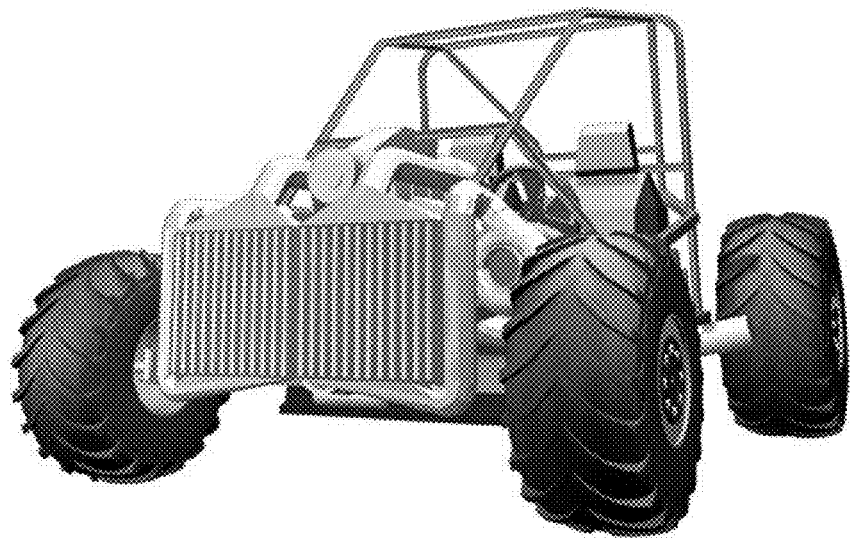
FIGS. 21 and 22 show detailed front and side views of a Kizmoto dune buggy toy system 100 in accordance with an exemplary embodiment of the present invention.
Figure 22:
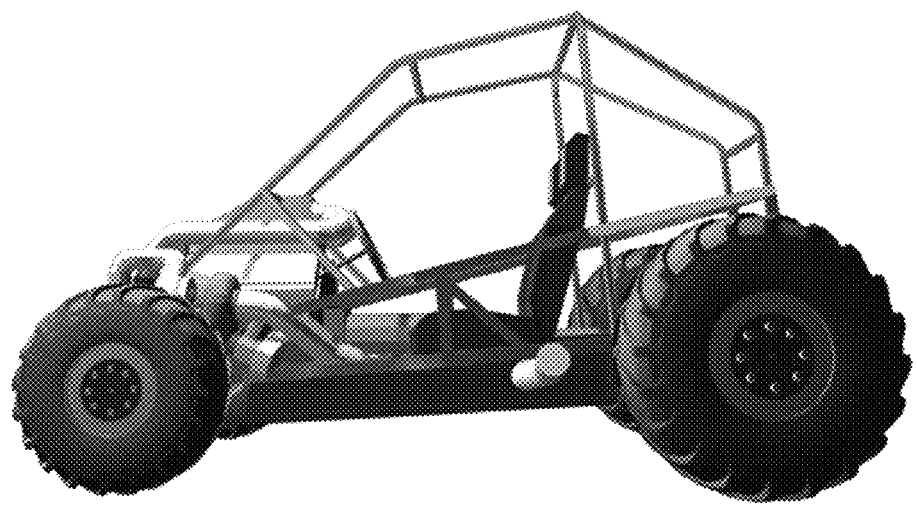

FIGS. 21 and 22 show detailed front and side views of a dune buggy toy system 100 in accordance with an exemplary embodiment of the present invention. The body of the dune buggy toy system 100 can be constructed from a hard injection molded plastic. The tires can be made from real rubber and can be connected by a steel rod running through 4 plastic molded guides located in the body of the dune buggy toy system 100, two on the front side and two on the back side. This can permit the wheels to rotate; thus, allowing the user to roll the dune buggy toy system 100 on the floor while playing with it. In one embodiment, the wheels are molded out of metal and allow the tires to be taken off and popped back on. This gives the user the ability to purchase different tires and wheels that may be interchanged on the dune buggy toy system 100. In an exemplary embodiment, the dune buggy toy system 100 can be designed as an open frame without windows. In an exemplary embodiment, the color of the dune buggy toy system 100 can represent a factory color. In this manner, the overall dune buggy toy system 100 can be a scaled down replica of the real thing.

Figure 23:
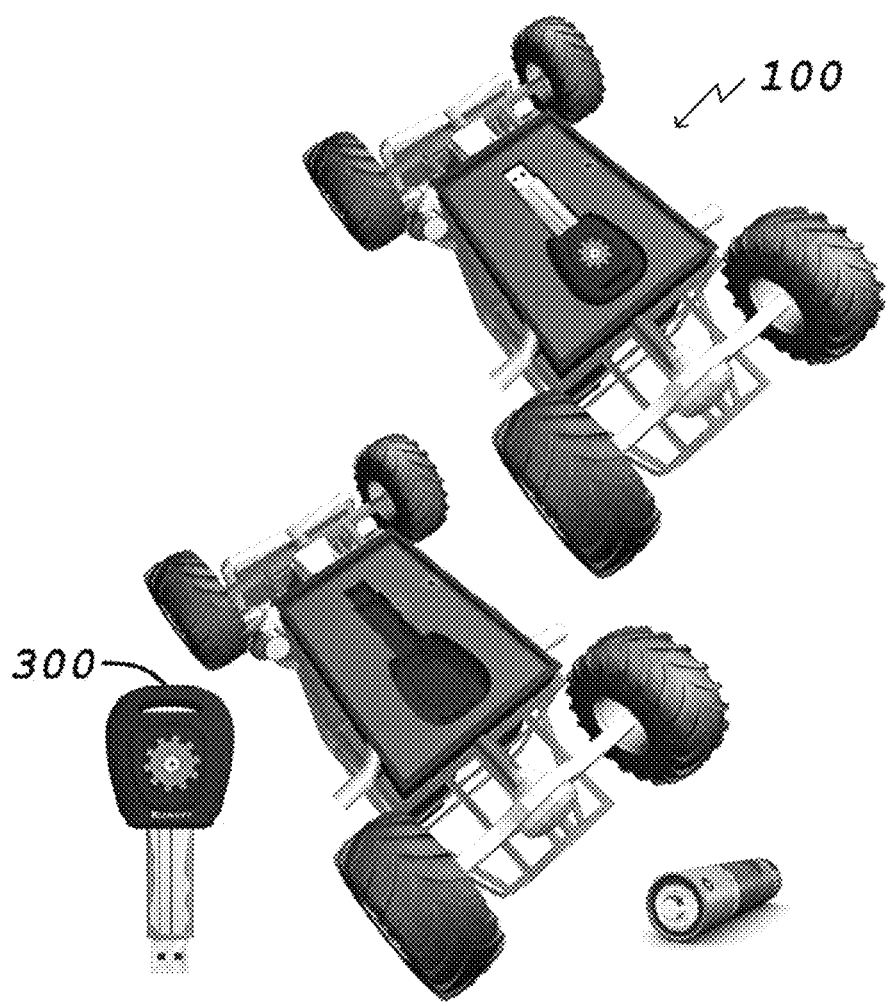
FIG. 23 illustrates the underside of the dune buggy toy system 100 in accordance with an exemplary embodiment of the present invention.

FIG. 23 illustrates the underside of the dune buggy toy system 100 in accordance with an exemplary embodiment of the present invention. The underside can be molded from a hard injection molded plastic. In the exemplary embodiment depicted in FIG. 23, a virtual world commodity device 300 can be stored within the housing of the dune buggy toy system 100. As shown in FIG. 23, the virtual world commodity device 300 in the exemplary embodiment can provide a USB port. In an exemplary embodiment, the user can connect the virtual world commodity device 300 to a personal computer and gain access to a restricted virtual world environment in which the user can play games and interact with a virtual representation of his or her dune buggy toy system 100. For example, and not limitation, the user could play a game in which he or she races a virtual representation of the dune buggy toy system 100 against the virtual representation of the dune buggy toy systems of other friends.

Figure 24:
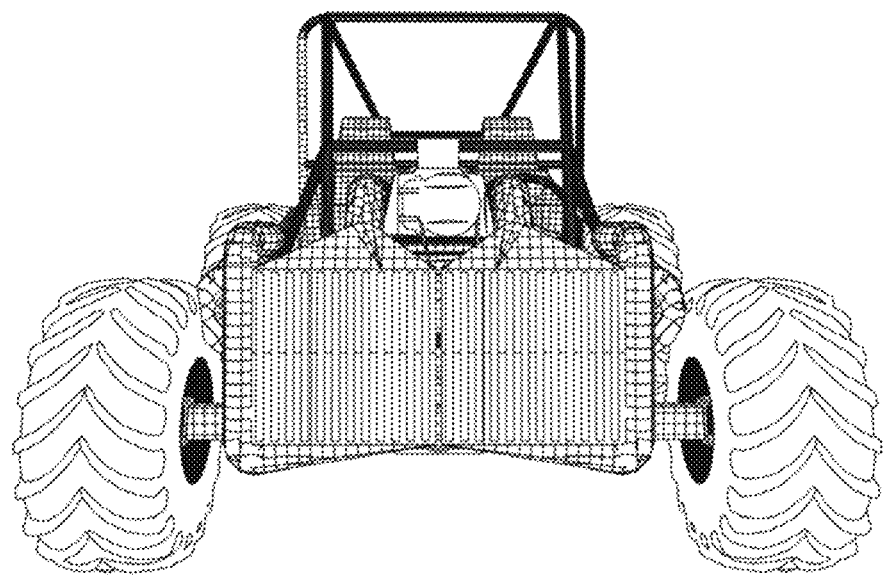
FIGS. 24 and 25 illustrate a three dimensional wireframe drawing of the front and side view of a dune buggy toy system 100 in accordance with an exemplary embodiment of the present invention.
Figure 25:
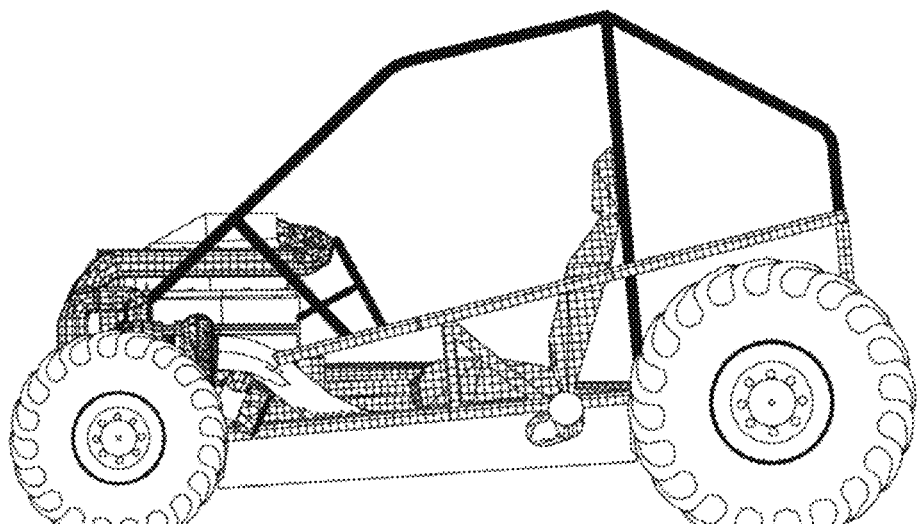

FIGS. 24 and 25 illustrate a three dimensional wireframe drawing of the front and side view of a dune buggy toy system 100 in accordance with an exemplary embodiment of the present invention. FIGS. 24 and 25 illustrate the intricate details and life-like features of the dune buggy toy system 100 in an exemplary embodiment.

Figure 26:
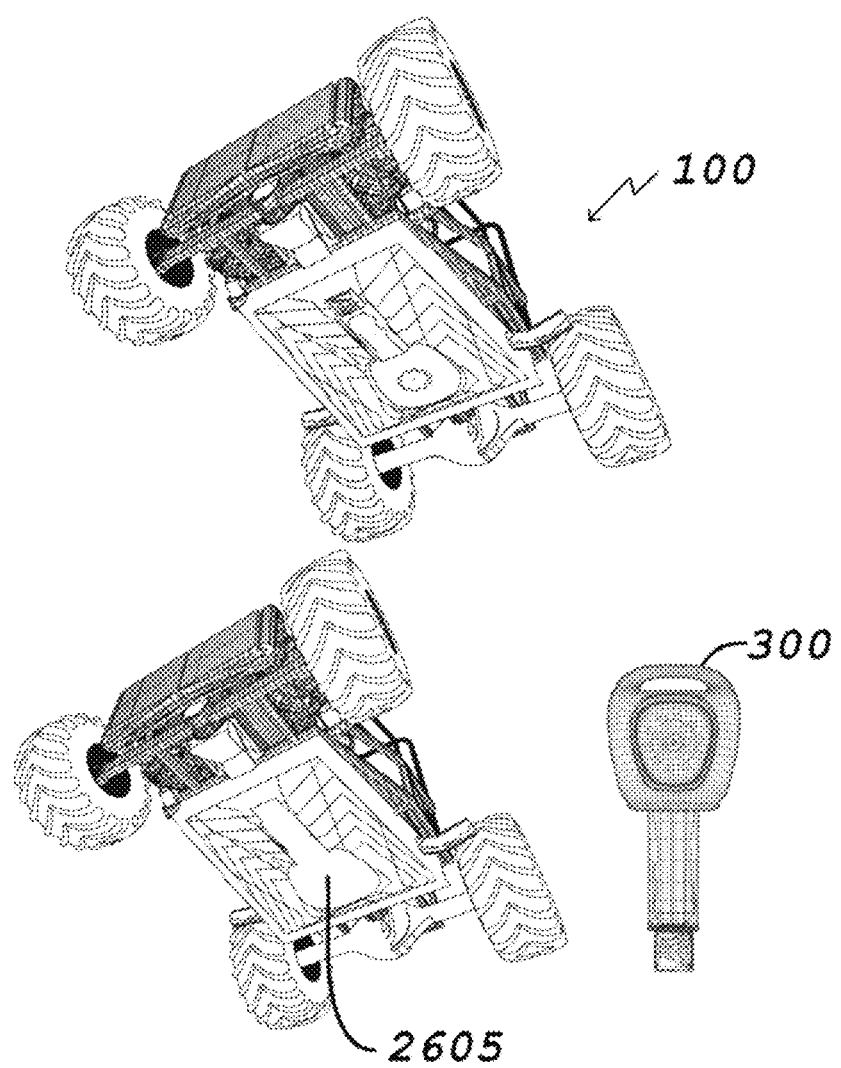
FIG. 26 shows a three dimensional wireframe drawing of the underside of dune buggy toy system 100 in accordance with an exemplary embodiment of the present invention.

FIG. 26 shows a three dimensional wireframe drawing of the underside of dune buggy toy system 100 in accordance with an exemplary embodiment of the present invention. In the exemplary embodiment depicted in FIG. 26, the virtual world commodity device 300 can be stowed in a cavity 2605 in the underside of the truck toy system 100.

Figure 27:
FIGS. 27 and 28 show detailed front and side views of a helicopter toy system 100 in accordance with an exemplary embodiment of the present invention.
Figure 28:
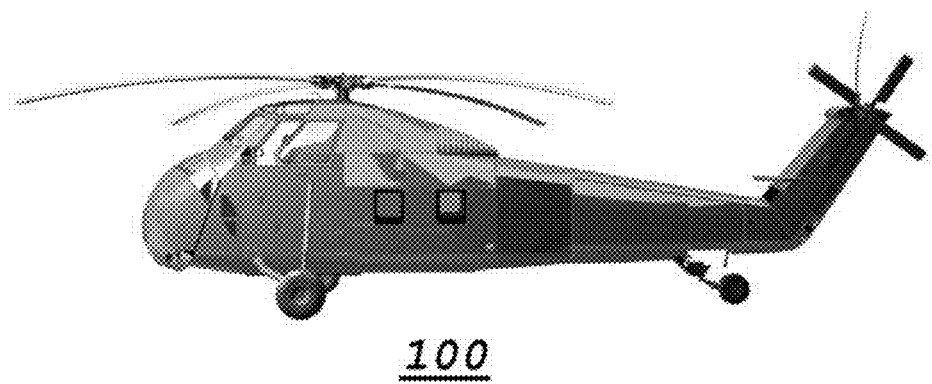

FIGS. 27 and 28 show detailed front and side views of a helicopter toy system 100 in accordance with an exemplary embodiment of the present invention. In an exemplary embodiment, the body of the helicopter toy system 100 can be constructed from a hard injection molded plastic. The tires of the exemplary embodiment of the helicopter toy system 100 can be made from real rubber and can be connected by a protruding plastic fitting located on the wheel support rods. This can permit the wheels to rotate; thus, allowing the user to roll the helicopter on the floor while playing with it. In the exemplary embodiment depicted in FIGS. 27 and 28, the helicopter toy system 100 has two propellers, one located on the top and the other at the rear, that can be attached by a protruding plastic fitting located in the same areas. This method of attachment in an exemplary embodiment can allow the user to freely spin both propellers. Thus, an exemplary embodiment of the helicopter toy system 100 can provide a life-like replica of an actual helicopter.

Figure 29:
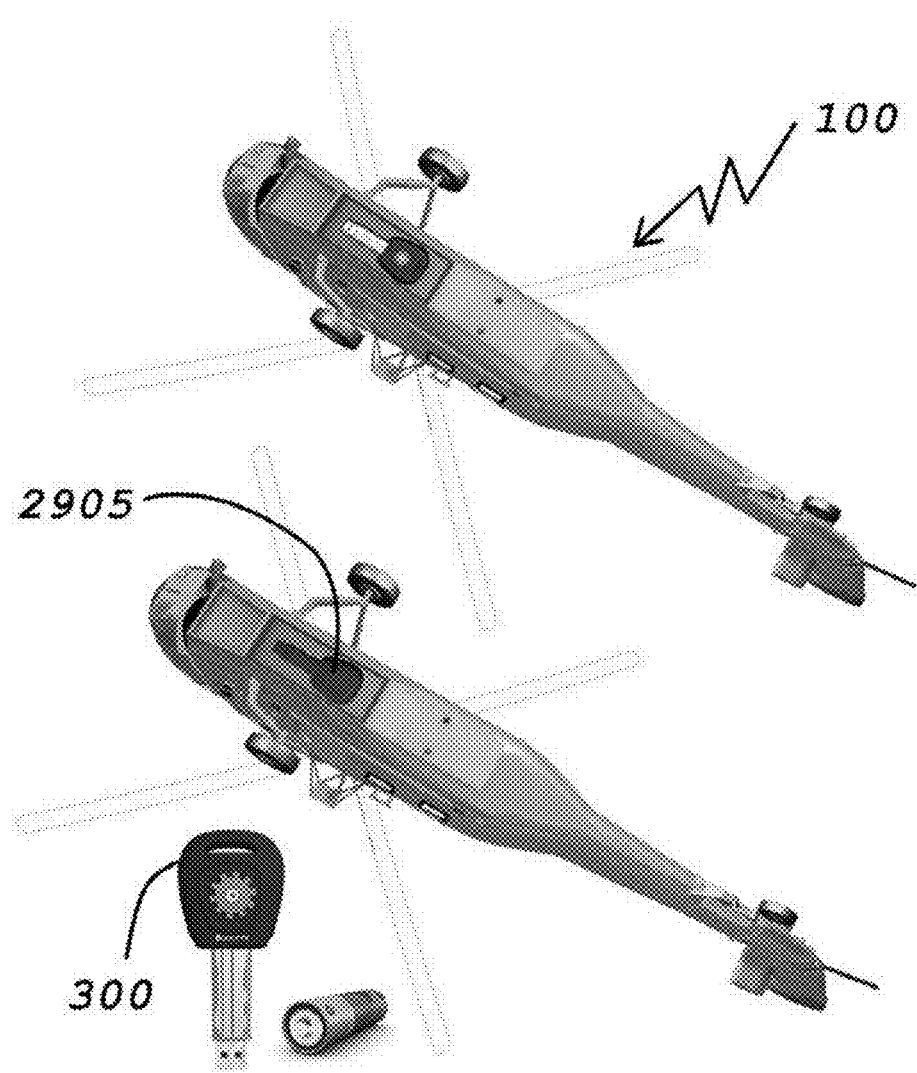
FIG. 29 illustrates the underside of the helicopter toy system 100 in accordance with an exemplary embodiment of the present invention.

FIG. 29 illustrates the underside of the helicopter toy system 100 in accordance with an exemplary embodiment of the present invention. The underside of helicopter toy system 100 in an exemplary embodiment can be molded from a hard injection molded plastic just like the top. The underside can contain the virtual world commodity device 300. In an exemplary embodiment, the virtual world commodity device 300 of the helicopter toy system 100 provides a USB port. The user can be enabled in this exemplary embodiment to remove the virtual world commodity device 300 from the helicopter toy system 100 and insert it into the USB port of an external device, such as a personal computer. Once connected to the personal computer, the virtual world commodity device 300 of an exemplary embodiment can enable the user to connect to a restricted virtual world environment. In one embodiment, the virtual world environment can verify the authenticity of the virtual world commodity device 300 by comparing a product unique identifier supplied by and stored on the virtual world commodity device 300 with a lookup table. Furthermore, in an exemplary embodiment a globally unique identifier can be transmitted for storage on the virtual world commodity device 300 once the authentication server of the virtual world environment has verified the device and associated it with an anonymous user profile. Once the authenticity of the virtual world commodity device 300 has been verified, the user can be permitted to access the restricted virtual world environment in an exemplary embodiment. In an exemplary embodiment, the restricted virtual world environment can provide the user with games to play. In one embodiment, the user can be enabled to play a game involving a virtual representation of the helicopter toy system 100. In the game of this exemplary embodiment, the user could be enabled to fly the virtual representation of the helicopter toy system 100 through an obstacle course, take off, and land the helicopter toy system 100. Furthermore, the user can be enabled in an exemplary embodiment of the virtual world environment to purchase certain components or accessories for the helicopter toy system 100. For example, the user could buy weapons or a bigger engine for the virtual representation of the helicopter toy system 100. In an exemplary embodiment, these commodities could be downloaded to a user's virtual world commodity device 300 in a commodity data set for storage and later use.

Figure 30:
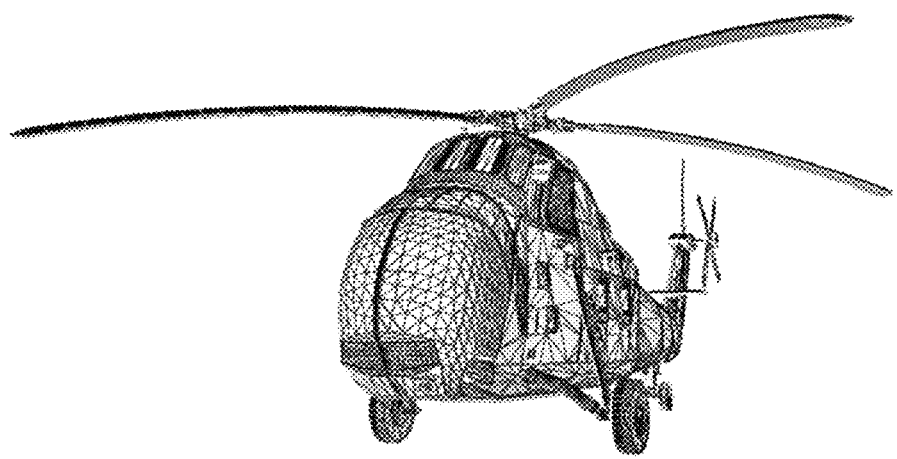
FIGS. 30 and 31 illustrate a three dimensional wireframe drawing of the front and side view of a helicopter toy system 100 in accordance with an exemplary embodiment of the present invention.
Figure 31:
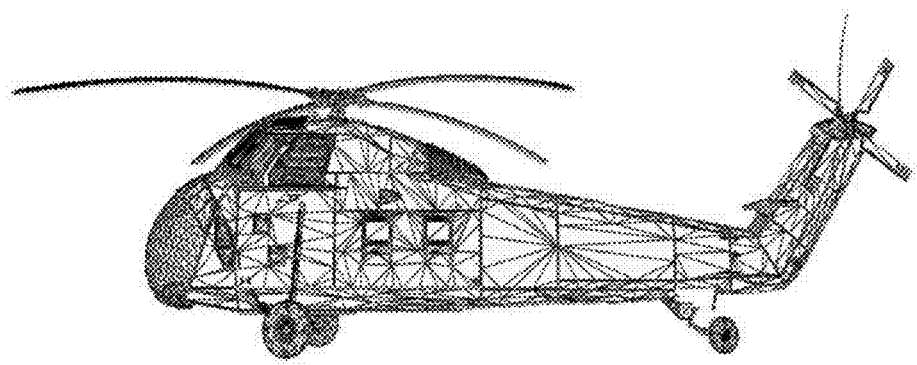

FIGS. 30 and 31 illustrate a three dimensional wireframe drawing of the front and side view of a helicopter toy system 100 in accordance with an exemplary embodiment of the present invention. FIGS. 30 and 31 illustrate the intricate details and life-like features of the helicopter toy system 100 in an exemplary embodiment.

Figure 32:
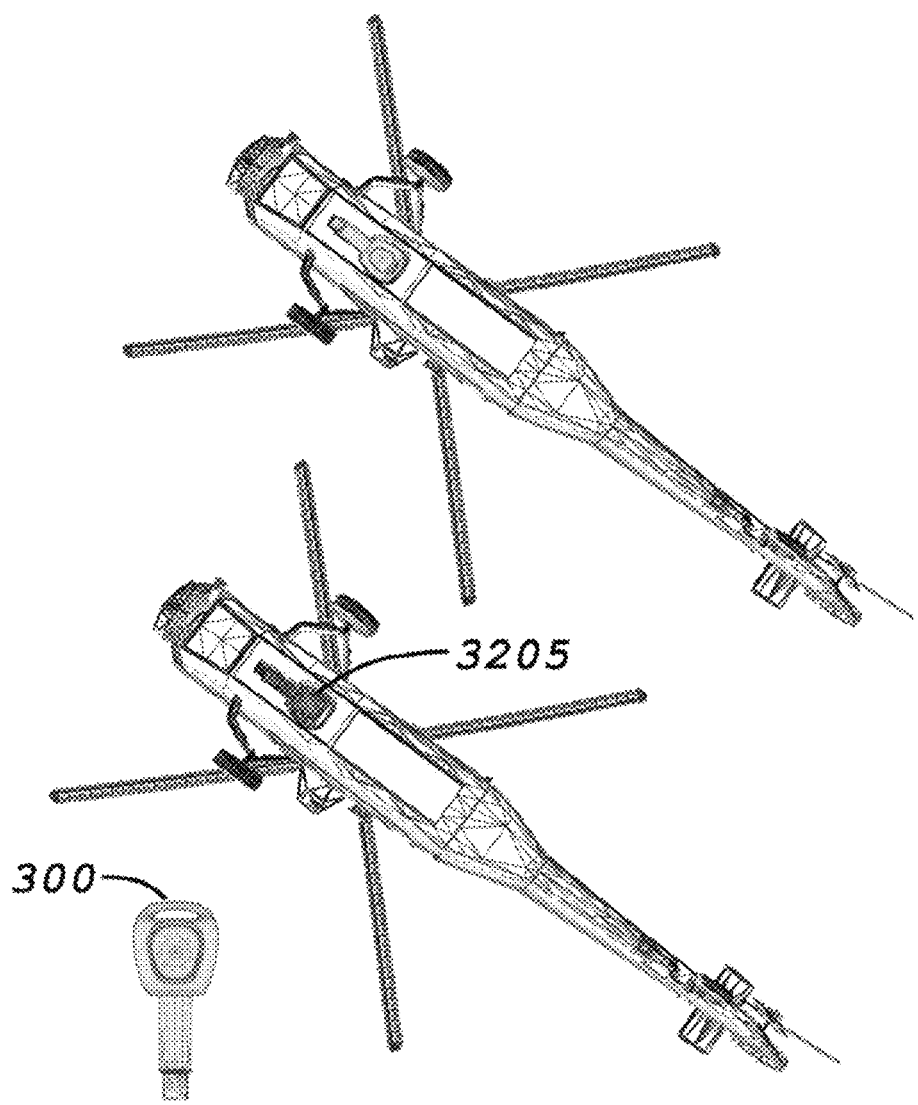
FIG. 32 shows a three dimensional wireframe drawing of the underside of helicopter toy system 100 in accordance with an exemplary embodiment of the present invention.

FIG. 32 shows a three dimensional wireframe drawing of the underside of helicopter toy system 100 in accordance with an exemplary embodiment of the present invention. In the exemplary embodiment depicted in FIG. 32, the virtual world commodity device 300 can be stowed in a cavity 3205 in the underside of the truck toy system 100.

Figure 33:
FIG. 33 shows the blister packaging that can be used to display and sell the sports car toy system 100.

FIG. 33 shows the blister packaging that can be used to display and sell the sports car toy system 100. The packaging can contain a color UV coated cardboard back along with a clear plastic blister pack front that allows the consumer to view the contents of the product. The cardboard back can be heat sealed to the front blister pack to help avoid tampering while in the retail stores. The top of the sealed packaging contains a cutout that can allow the item to hang on a standard retail store peg. In the packaging shown in FIG. 33, the virtual world commodity device is displayed independent of the housing of sports car toy system 100, but the virtual world commodity device may be permitted to be stored within the housing of the sports car toy system 100.

Figure 34:
FIG. 34 shows the blister packaging that can be used to display and sell the truck toy system 100.

FIG. 34 shows the blister packaging that can be used to display and sell the truck toy system 100. The packaging can contain a color UV coated cardboard back along with a clear plastic blister pack front that allows the consumer to view the contents of the product. The cardboard back can be heat sealed to the front blister pack to help avoid tampering while in the retail stores. The top of the sealed packaging contains a cutout that can allow the item to hang on a standard retail store peg. In the packaging shown in FIG. 34, the virtual world commodity device is displayed independent of the housing of the truck toy system 100, but the virtual world commodity device may be permitted to be stored within the housing of the truck toy system 100.

Figure 35:
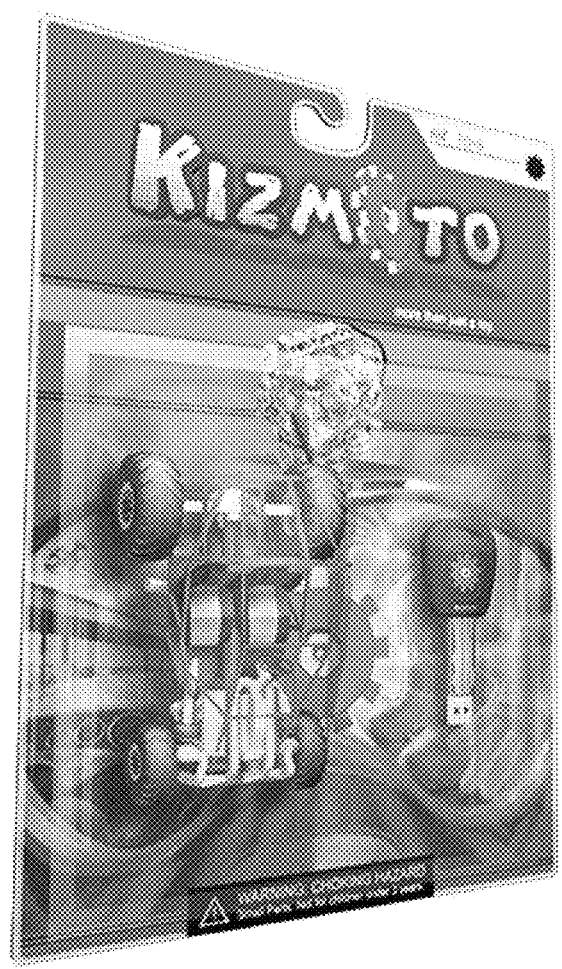
FIG. 35 shows the blister packaging that can be used to display and sell the dune buggy toy system 100.

FIG. 35 shows the blister packaging that can be used to display and sell the dune buggy toy system 100. The packaging can contain a color UV coated cardboard back along with a clear plastic blister pack front that allows the consumer to view the contents of the product. The cardboard back can be heat sealed to the front blister pack to help avoid tampering while in the retail stores. The top of the sealed packaging contains a cutout that can allow the item to hang on a standard retail store peg. In the packaging shown in FIG. 35, the virtual world commodity device is displayed independent of the housing of the dune buggy toy system 100, but the virtual world commodity device may be permitted to be stored within the housing of the dune buggy toy system 100.

Figure 36:
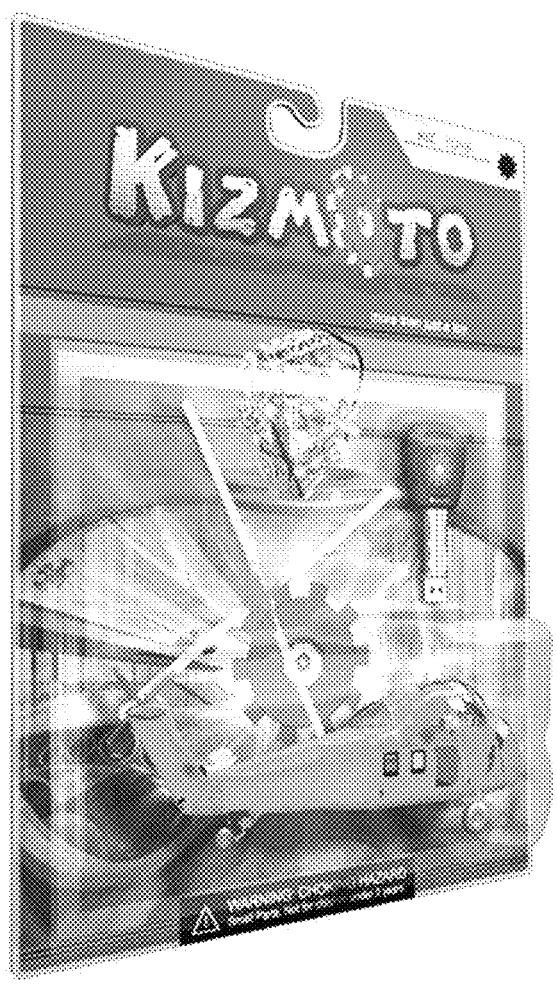
FIG. 36 shows the blister packaging that can be used to display and sell the helicopter toy system 100.

FIG. 36 shows the blister packaging that can be used to display and sell the helicopter toy system 100. The packaging can contain a color UV coated cardboard back along with a clear plastic blister pack front that allows the consumer to view the contents of the product. The cardboard back can be heat sealed to the front blister pack to help avoid tampering while in the retail stores. The top of the sealed packaging contains a cutout that can allow the item to hang on a standard retail store peg. In the packaging shown in FIG. 36, the virtual world commodity device is displayed independent of the housing of the helicopter toy system 100, but the virtual world commodity device may be permitted to be stored within the housing of the helicopter toy system 100.

Figure 37:
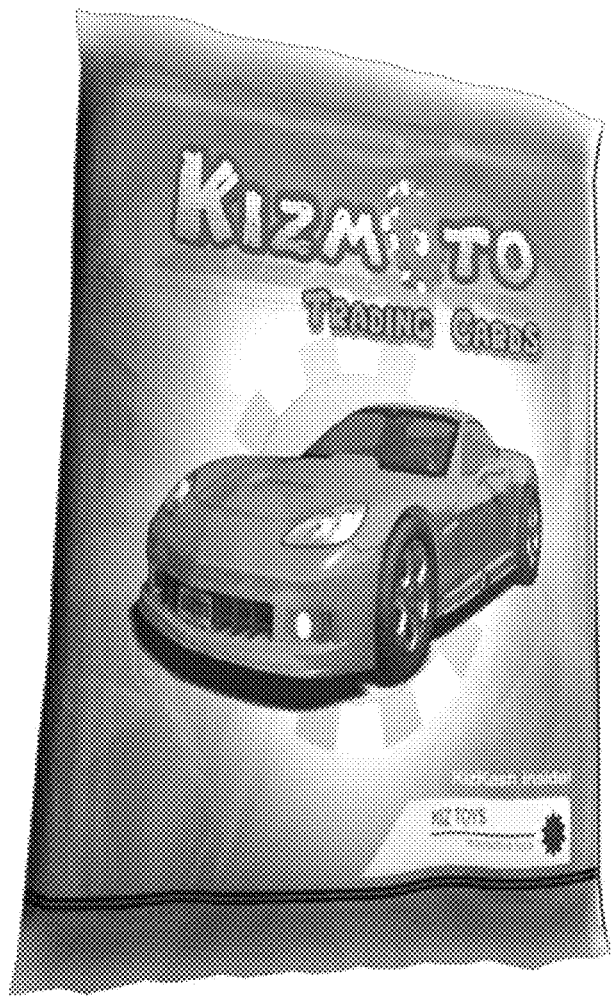
FIG. 37 shows the Kizmoto Trading Cards that can be made available for sale in the similar retail locations that carry the Kizmoto toy systems.

FIG. 37 shows the Kizmoto Trading Cards that can be made available for sale in the similar retail locations that carry the Kizmoto toy systems. In an exemplary embodiment, these Trading Cards can provide certain virtual world commodities. In an exemplary embodiment, each pack of trading cards can contain six random trading cards, one hidden Kiz Kash certificate and one virtual coupon for a virtual world environment. The value of Kiz Kash certificate can be randomly placed in each pack. Both the Kiz Kash certificate and the virtual coupon can be redeemable within the Kizmoto virtual playground virtual world environment. Kiz Kash is an example of a virtual world commodity that entitles a user to certain assets in a virtual world environment. For example, a user having the sports car toy system 100 can purchase the Kizmoto Trading Cards and use the virtual coupon to buy accessories or other commodities for the virtual representation of the sports car toy system 100 in the virtual world environment.

In an exemplary embodiment, the eight trading cards can be foil packed together. The front of the package has the Kizmoto logo printed in the upper center and various toy systems can be depicted on the front center of the package. In an exemplary embodiment, the six trading cards can be designed as a collectables. In one embodiment, the trading cards contain a Kizmoto hologram gear seal in the lower right corner on the front of the card and a detailed photo of the actual production model of the toy system on the front side and a virtual representation of the model on the other side. Statistical information about the toy model can be printed on both sides of the card. In an exemplary embodiment, each card can provide hidden clues that will help enhance the user's virtual experience during virtual world game play in virtual world environment.

Figure 38:
FIG. 38 illustrates the home page to the Kizmoto.com virtual world website 3800 in accordance with an exemplary embodiment of the present invention.

FIG. 38 illustrates the home page to the Kizmoto.com virtual world website 3800 in accordance with an exemplary embodiment of the present invention. In an exemplary embodiment, this is where the user will be redirected when they connect the virtual world commodity device with a personal computer. In an exemplary embodiment, when the virtual world commodity device is plugged into a computer's USB port or a USB hub connected to the computer, software embedded on the virtual world commodity device can direct the computer to connect to an authentication server of the Kizmoto.com virtual world website 3800 in order to validate authenticity of the virtual world commodity device. The virtual world commodity device software can send a product unique identifier to the authentication server of the Kizmoto.com virtual world website 3800. The authentication server can then verify the product unique identifier and generate a globally unique identifier to associate the virtual world commodity device with an anonymous user profile. In an exemplary embodiment, once the virtual world commodity device has been verified, the server can redirect the user to the appropriate Kizmoto.com virtual world website page based on the model of the toy. In an exemplary embodiment, the virtual world commodity device can be associated with a sports car toy system 100, and the authentication server can redirect the user to the Kizmoto.com virtual world website page for the virtual sports car. Once the user gains access to the restricted Kizmoto.com virtual world website 3800, in an exemplary embodiment, they can begin their virtual experience.

The Kizmoto.com virtual world website 3800 can be designed so that the average user will be able to navigate without any prior training. After the server determines which toy system the user is playing with, it can show a virtual representation of the toy system in this area.

In an exemplary embodiment, the Kizmoto.com virtual world website 3800 can provide a main navigation bar, which can enable the user will be able to navigate to various areas within the website. In an exemplary embodiment, the navigation bar can be constant across all sub-pages so that the user does not get confused when jumping around from webpage to webpage. The first option on the navigation bar can be "Home". When the user clicks on this link it can take them back to main or home page of the Kizmoto.com virtual world website 3800. In an exemplary embodiment, dynamic marketing data can exist on the home page of the Kizmoto.com virtual world website 3800, along with other fun stuff that the user can do. The next item on the navigation bar can be "Kizmoto Zone". When the user clicks on this link it can take them to an online store so that they may purchase various upgrades for their virtual toy. In one embodiment, these purchases can be made with the Kiz Kash that the user can earn while playing in the Kizmoto.com virtual world website 3800. In an alternative embodiment, purchases can be made with a credit card or other forms of payment. The next item on the navigation bar can be "My Garage". When the user clicks on this link, it can take them to a virtual garage where their virtual toy is located. The next item on the navigation bar can be "Motos". When the user clicks on this link it can take them to a sub-page that can show them available Kizmoto toys so that they can see what is available for purchase. Kiz Toys can display the current product line including, limited additions, special releases along with all the past retired models. In an exemplary embodiment, the user can click on a particular model to see other statistical information such as how many units were made, when did or does it retire, and what upgrades are available. The last item on the navigation bar can be "About Kizmoto". When the user clicks on this link it takes them to a sub-page that will give a brief history along with contact information for Kiz Toys and Kizmoto.

Figure 39:
FIG. 39 shows the maintenance sub-page of the Kizmoto.com virtual world website 3800 that allows the user to perform various functions on their virtual toy.

FIG. 39 shows the maintenance sub-page of the Kizmoto.com virtual world website 3800 that allows the user to perform various functions on their virtual toy. In an exemplary embodiment, the maintenance sub-page can enable the user to have the ability to maintain, paint, wash as well as perform general customization to their virtual toy. In an exemplary embodiment, the user can take advantage of one or more of these actions by selecting the appropriate view. They can choose to look at the front, side, top, bottom and under the hood of the virtual toy. After the user chooses a particular view they can then perform various tasks within that view. If a user wishes to change the brakes on a virtual toy car because the brakes have worn down and a warning has been noticed, then the user can go to Kizmoto Zone and make the necessary brakes purchase with their Kiz Kash or other form of payment. In alternate embodiment, the user can earn Kiz Kash by playing a game or other interactive virtual activity. After the user has earned enough Kiz Kash they then can purchase the new brake pads. After they purchase the new brake pads they can then go back to My Garage and select the side view in an exemplary embodiment. Once they choose a side, they can then choose a brake pad and drag it on the front wheel. After that they can drag on the rear wheel. The user can then swap to the opposite side and complete the same task on this side. In another example, the user could change the spark plugs. The user could purchase the new spark plugs and then look under the hood by choosing the correct view. Additional statistical data could be made available to the user every time they enter this section of the website.

Figure 40:
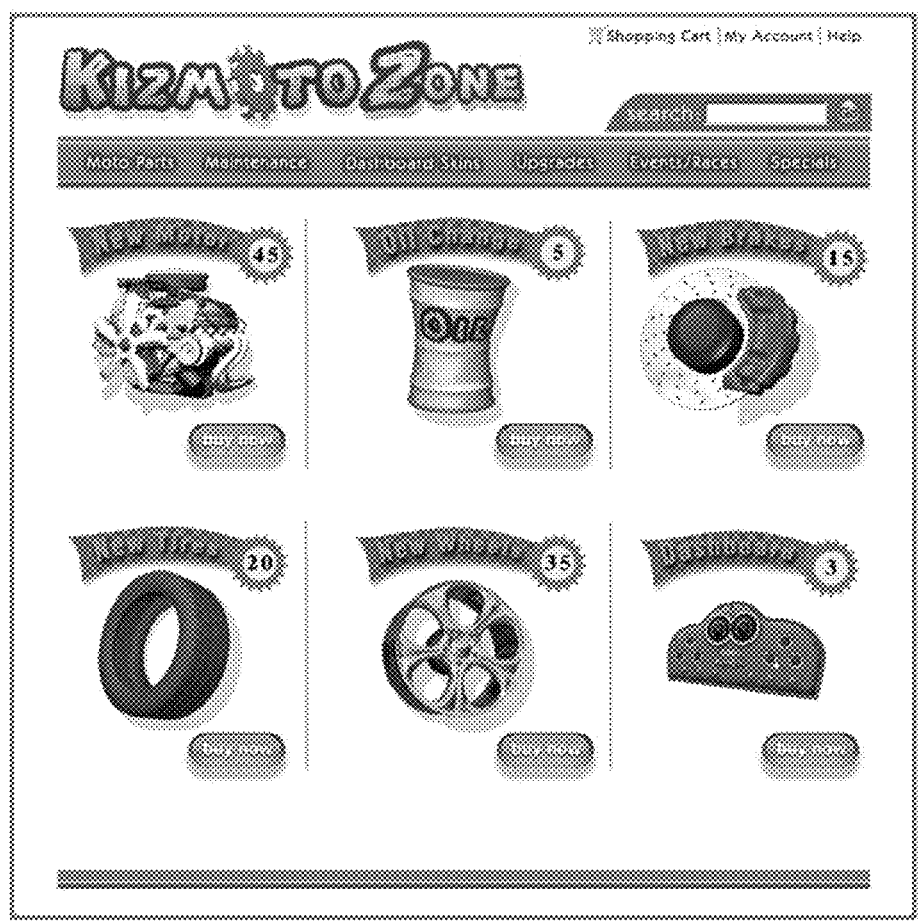
FIG. 40 illustrates an exemplary embodiment of a virtual store called Kizmoto Zone of the Kizmoto.com virtual world website 3800.

FIG. 40 illustrates an exemplary embodiment of a virtual store called Kizmoto Zone of the Kizmoto.com virtual world website 3800. In the virtual store, user can make necessary purchases of general parts or maintenance items such as oil, brakes, spark plugs, and tires. They can also go here to purchase various upgrades, such as new dashboards, high performance engines, racing wheels or premium radios. The user can also view ongoing events or races that are scheduled in the virtual playground of the Kizmoto.com virtual world website 3800. Items in the Kizmoto Zone can be purchased with Kiz Kash, which can be earned by the user in play in the virtual playground. In an exemplary embodiment, the user making a purchase from the Kizmoto Zone can be given multiple options. For example, and not limitation, the user can choose between 10W40, 10W30 or Synthetic oil for an oil change. Each type of oil may cost different amounts just like in the real world. In an exemplary embodiment, the 10W40 and 10W30 might cost 5 Kiz Kash dollars while the Synthetic might cost 10. Just like in the real world, the user can determine which oil will run best in their virtual toy. If they put a high-performance engine in a virtual car, then they may want to put a higher grade oil into the engine, whereas a stock engine might run just fine with standard oil.

Figure 41:
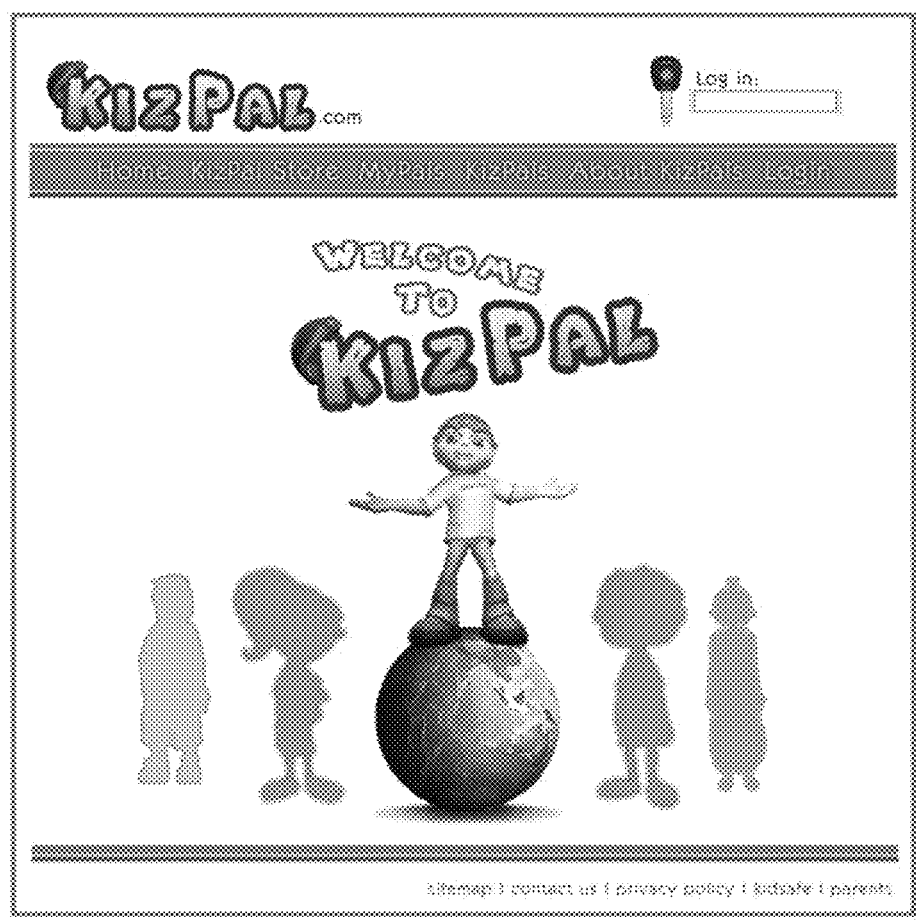
FIG. 41 illustrates the home page to the KizPal.com virtual world website in accordance with an exemplary embodiment of the present invention.

FIG. 41 illustrates the home page to the KizPal.com virtual world website in accordance with an exemplary embodiment of the present invention. In an exemplary embodiment, this is where the user can be redirected when they plug in a Kiz Pal virtual world commodity device. When the virtual world commodity device is plugged into the computer's USB port or a USB hub connected to the computer, in an exemplary embodiment the software embedded on the virtual world commodity device can automatically connect to an authentication server in order to validate authenticity of the virtual world commodity device. The software can send a product unique identifier to the authentication server of the Kizmoto.com virtual world website. The authentication server can then verify the product unique identifier of the virtual world commodity device in an exemplary embodiment. In an exemplary embodiment, once the virtual world commodity device has been verified, the server can redirect the user to the appropriate page of the Kizmoto.com virtual world website based on the globally unique identifier of the virtual world commodity device. In this case the virtual world commodity device belongs to a Kiz Pal action figure toy system 100 and the authentication server will redirect the user to the Kiz Pal page of the Kizmoto.com virtual world website. In an exemplary embodiment, once the user enters the website they can begin their virtual experience.

The Kiz Pal page of the Kizmoto.com virtual world website 3800 can link to the "Kiz Pal Store". When the user clicks on this link it can take them to an online store so that they may purchase various products (clothes, food, phones, etc . . . ) for their virtual Kiz Pal action figure. These purchases can be made with the Kiz Kash that the user can earn while playing in the virtual playground. The next item on the navigation bar shown in FIG. 41 can be "My Pals". When the user clicks on this link it takes them to a virtual room where they can play with their virtual action figure. The next item on the navigation bar shown in FIG. 41 can be "Kiz Pals". When the user clicks on this link it can take them to a sub-page that will show them all the available Kiz Pal toys so that they can see what is available for purchase. Kiz Toys can display the current product line including limited additions and special releases, along with all the past retired action figures. The user can also click on a particular action figure to see other statistical information such as how many units were made, when did or does it retire, what virtual products are available. The last item on the navigation bar depicted in FIG. 41 can be "About Kiz Pal". When the user clicks on this link it can take them to a sub-page that will give a brief history along with contact information for Kiz Toys and Kiz Pal.

Figure 42:
FIG. 42 shows the Kiz Pal alteration sub-page for KizPal.com in accordance with an exemplary embodiment of the present invention.

FIG. 42 shows the Kiz Pal alteration sub-page for KizPal.com in accordance with an exemplary embodiment of the present invention. If you notice up in the upper right hand corner you will see that the Max action figure USB key has been plugged in and the user is in the alteration sub-page in order to make changes to Max's appearance. In this area the user can have the ability in an exemplary embodiment to change Max's entire wardrobe. In one embodiment, user can reuse the clothes whenever they wish because they can be stored in their Kiz Closet. To change one of the action figures clothing, the user can select the clothing area such as coats, shirts, pants or shoes. Then the user can click through the wardrobe and watch the action figure dynamically changing into the new item. Once a complete wardrobe has been selected by the user, it can remain on the action figure so that they can play with it in the virtual world.

Figure 43:
FIG. 43 shows the blister packaging used to display and sell the Kiz Pal action figure toy system 100 in accordance with an exemplary embodiment of the present invention.

FIG. 43 shows the blister packaging used to display and sell the Kiz Pal action figure toy system 100 in accordance with an exemplary embodiment of the present invention. The packaging can contain a color UV coated cardboard back along with a clear plastic blister pack front that allows the consumer to view the contents of the product. The cardboard back can be heat sealed to the front blister pack to help avoid tampering while in the retail stores. The top of the sealed packaging can contain a cutout that can allow the item to hang on a standard retail store peg.

Figure 44:
FIG. 44 shows the front and back sides of the virtual Kiz Kash that can be used throughout the various virtual world environments.
Figure 44:

FIG. 44 shows the front and back sides of the virtual Kiz Kash that can be used throughout the various virtual world environments. The front of the Kiz Kash note can have a picture of Max, a Kiz Toys mascot, located in the center of the bill. Similar to a real dollar bill, the denomination can be located in all four corners of the currency. If the value of the note is $1 then a 1 can be on all four corners and if the value is $10 then a 10 can be shown. The various denominations can be $1, $5, $10, $20 and $100 in an exemplary embodiment.

In an exemplary embodiment, the backside of the bill can have the Kizmoto logo, just like the one on the front side, located in the top center of the bill. The denomination can she shown in all four corners along with a big word that indicates the value of the currency. In an exemplary embodiment, two common graphics can be taken from the virtual world environment so that the origin of the bill can easily be determined. For example and not limitation, the Kizmoto currency can depict the helicopter and truck toy systems.

In an exemplary embodiment, Kizmoto.com virtual world has its own Kiz Kash and FIG. 44 illustrates the currency for Kizmoto.com. In an exemplary embodiment, Kiz Kash notes can be used in many virtual world environments. Thus, a user earning $100 of Kiz Kash in Kizmoto.com can spend it in the Kiz Pal virtual world environment. In an exemplary embodiment, a user can earn Kiz Kash every day by simply access the virtual world environment, but they can also earn Kiz Kash by other virtual world activities. For example and not limitation, Kiz Kash can be earned in the arcade. User can earn Kiz Kash in an exemplary embodiment by simply playing the games, and earn even more Kiz Kash when they begin to master a game. In an exemplary embodiment, the longer a user plays, the better their earnings. In one embodiment, if a user happens to beat a high score or simply get on the high score board then they can earn extra Kiz Kash.

Figure 45:
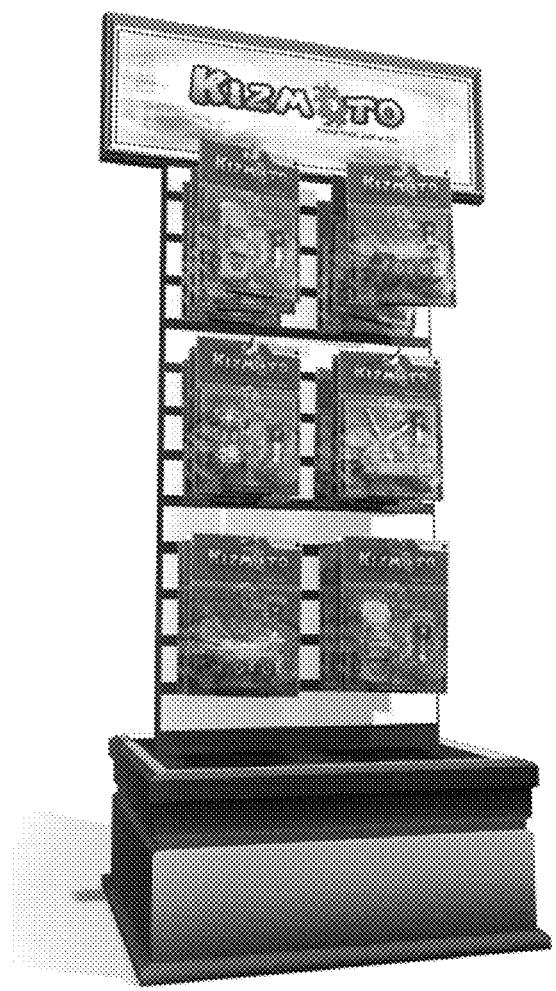
FIG. 45 illustrates a Kizmoto freestanding pegboard store display that can be used in both large and small retail stores in accordance with an exemplary embodiment of the present invention.

FIG. 45 illustrates a Kizmoto freestanding pegboard store display that can be used in both large and small retail stores in accordance with an exemplary embodiment of the present invention. As shown in FIG. 45, the display can be designed to have a clean appearance and be free of clutter.

Figure 46:
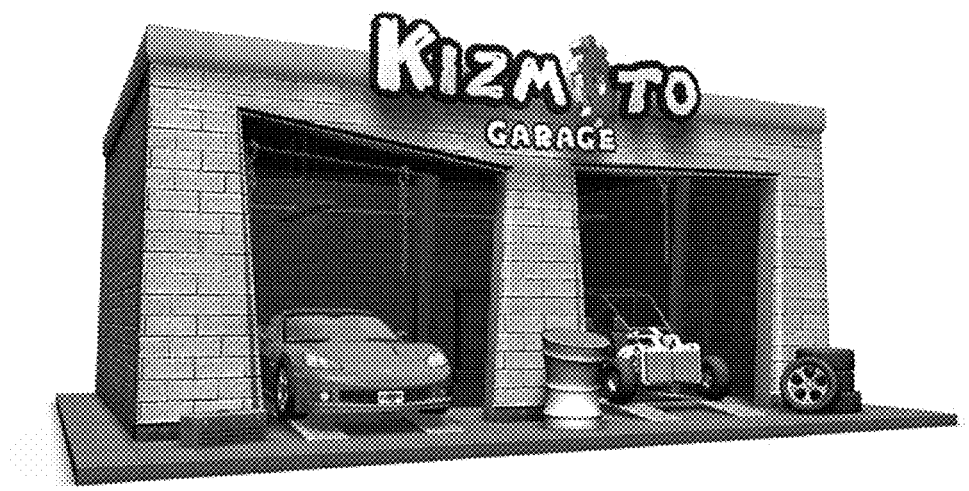
FIG. 46 illustrates an exemplary embodiment of Kizmoto Garage virtual world in accordance with an exemplary embodiment of the present invention.

FIG. 46 illustrates an exemplary embodiment of Kizmoto Garage virtual world in accordance with an exemplary embodiment of the present invention. This Kizmoto Garage can be available in both a retail and virtual version. The retail version can be made from a hard plastic injection molding process and can also function as a USB hub. The outside of the garage's texture can be similar to real brick. In an exemplary embodiment, the toolbox, 50 gallon oil drum and tires can all be part of the injection mold and are not removable. Both lift ramps in the garage can have small indentations in them so that when the user parks their toy system inside, it will sit down in the indentation and not roll around. The Kizmoto logo and the word Garage can be located in the top center of the garage just above the two bay doors. Various manufacturing data is printed on the underside of the garage.

In an exemplary embodiment, the Kizmoto Garage shown in FIG. 46 is a USB hub with a USB cable and plug protruding from the back. The user can plug this USB cable into a computer's USB port. The top of the Kizmoto Garage can provide multiple USB ports, into which the user can plug many USB virtual world commodity devices. They can then store their toy inside the garage and plug a USB virtual world commodity device into the topside of the garage just above the garage door bay. Once the user has plugged the USB virtual world commodity device into the garage's USB port, then the authentication process can automatically start and the user can play with both their virtual toy and virtual garage.

In accordance with various embodiments of the present invention, numerous other buildings or structures can be provided as hubs for the insertion of multiple virtual world commodity devices, such as hangers, train stations, race tracks and shipping ports. In one embodiment, virtual world commodity device hub is shaped like the Kizmoto Gear, such that the shape of the top half of a gear, like the one in the logo, and has five sprockets pointing upward. Each of these sprockets of the virtual world commodity device hub can have a USB port located at the top for a total of five individual USB ports for virtual world commodity devices. This virtual world commodity device hub allows the user to plug in a Kizmoto virtual world commodity device along with up to four Kiz Pal toys so that they can interact with the virtual representations of five toy systems 100 at the same time. In an exemplary embodiment, this could allow the user to have a driver and many passengers or have multiple virtual toy cars racing at one time. The virtual world commodity device hub can also allow the user to determine who the driver is and who the passengers are while remaining anonymous.

The virtual world commodity device hub can provide the user with a whole new way to interact with both their retail and virtual toy. It can also enable the user to interact with a virtual toy but also have their virtual toy interact with their other virtual toys.

Figure 47:
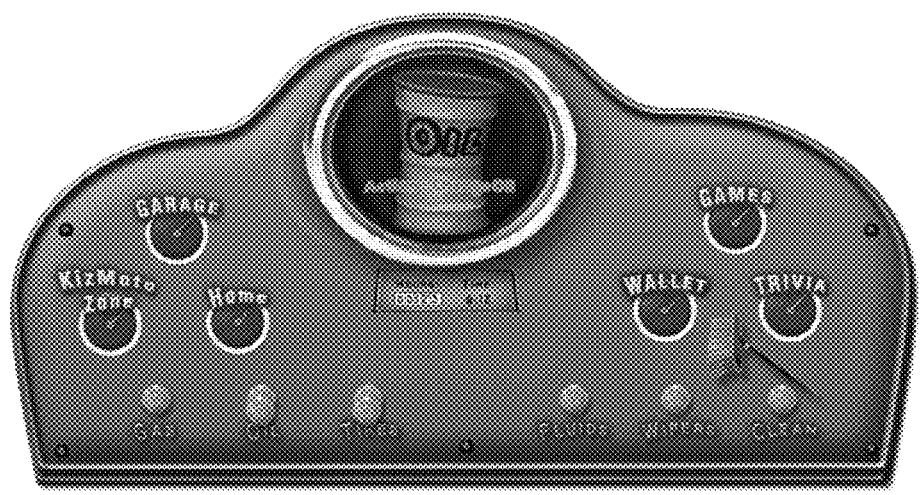
FIG. 47 shows a Kizmoto dashboard in accordance with an exemplary embodiment of the present invention.

FIG. 47 shows a Kizmoto dashboard in accordance with an exemplary embodiment of the present invention. In an exemplary embodiment, the Kizmoto virtual toy comes with its own dashboard. The dashboard can be an instrumental part of the virtual experience. It can allow the user to monitor and maintain their Kizmoto virtual toy on an ongoing basis. Once a user connects to the Kizmoto virtual world environment, they can check the dashboard regularly in order to ensure that the virtual toy is working properly. The dashboard can let them know if their virtual toy's tires need air, if the toy needs gas or if the toy needs simply to be cleaned. This type of interaction can inform the user of valuable information for maintaining real life vehicles.

In an exemplary embodiment, the dashboard can consist of several gauges and lights. In the exemplary embodiment shown in FIG. 47, the three small dials located on the left side of the dashboard can allow the user to visit their garage and work on their virtual toy or they can visit the Kizmoto Zone in order to purchase products or upgrades for their virtual toy. The three small dials located on the right side of the dashboard can allow the user to play games in the Kizmoto arcade or answer trivia in the Kizmoto quiz room. Both of these areas can allow the user to earn Kiz Kash. The other dial can be for the Kizmoto wallet and can allow the user to see how much Kiz Kash the currently have. The lower section of the dashboard can be lined up with information lights. These lights can warn the user of potential issues with the virtual toy that may need their attention.

In exemplary embodiment, the Kizmoto virtual toy comes with a factory dashboard, but the user can purchase a different dashboard as an upgrade. The user can purchase the upgraded dash with Kiz Kash or other form of payment. Additional upgrades may be made to the dashboard as well, such as a radio or clock.

The dashboard's gauges and lights can help the user see what is going on with their virtual toy. For example, if the gas is running low the light can start to glow and if it is approaching empty it can begin to flash, letting the user know they need to act immediately. In an exemplary embodiment, once a warning light is activated, the user can simply click on the light or gauge and make the necessary purchase in order to fix the problem. In an exemplary embodiment, this can be an ongoing situation when interacting with their virtual toy and can serve as a valuable lesson in responsibility.

Figure 48:
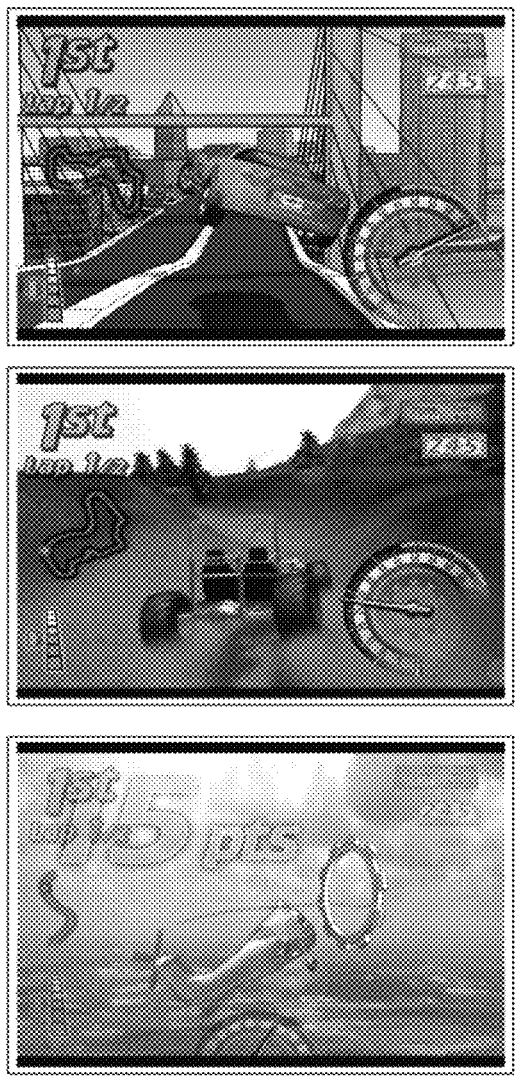
FIG. 48 illustrates an exemplary embodiment of games available in the virtual world environments in accordance with the present invention.

FIG. 48 illustrates an exemplary embodiment of games available in the virtual world environments in accordance with the present invention. Many games and activities can be available in the Kizmoto arcade virtual world environment. In an exemplary embodiment, the games can be restricted to a specific toy system and can only be accessed by having purchased the corresponding toy system. For example and not limitation, only those users purchasing a sports car toy system 100 would be permitted to the play the sports car game. In an exemplary embodiment, the other users would be permitted to view the sports car game, but only those that have purchased the sports car toy system 100 would be granted access to it.

Other games and activities can exist that a Kizmoto user will have access to along with the ability to earn Kiz Kash or other virtual world commodity on a regular basis. Some example categories of these games are racing, strategy and fantasy along with several others. In an exemplary embodiment, the user can earn Kiz Kash or other virtual world commodity simply by playing a game. In one embodiment, the user can earn even more Kiz Kash the longer they play without losing.

FIG. 48 provides an illustration of three games provided in the virtual world environment of the Kizmoto.com virtual world website 3800 in accordance with an exemplary embodiment of the present invention. The top two games shown in the FIG. 48 are example of racing games. In an exemplary embodiment, the overall goal in these games is to finish the course as fast as you can without wrecking your vehicle. The top one is standard paved road course that takes the user through various virtual cities. In an exemplary embodiment, the conditions in the course can continually change from rain, snow, day and night. The second game illustrated in FIG. 48 in an exemplary embodiment provides a dirt track race course. In an exemplary embodiment, this race course can have a different set of challenges such as mud, sand and water. In an exemplary embodiment, the third game illustrated in FIG. 48, on the bottom, is a strategy game. In the third game, the user can maneuver the helicopter through a sky maze of obstacles while avoiding crashing.

In an exemplary embodiment, the play of games by the user can cause wear and tear on the virtual toy causing them to need to replace things like tires and breaks. This allows the game play in the Kizmoto.com virtual world website 3800 to become as real as possible by letting the user take their virtual toy and play with it in the game itself.

Figure 49:
FIG. 49 illustrates the Kizmoto Kiz Safe logo in accordance with an exemplary embodiment of the present invention.

FIG. 49 illustrates the Kizmoto Kiz Safe logo in accordance with an exemplary embodiment of the present invention. This logo can be used to represent the integrated technology developed by Kiz Toys to help ensure that Kizmoto.com remains safe. This logo can appear on Kizmoto marketing material and merchandise. The picture with the lock and the silhouette of the guardian and user can be to indicate the safeguards and user protection provided by the anonymous virtual world interaction enabled by the present invention.

Figure 50:
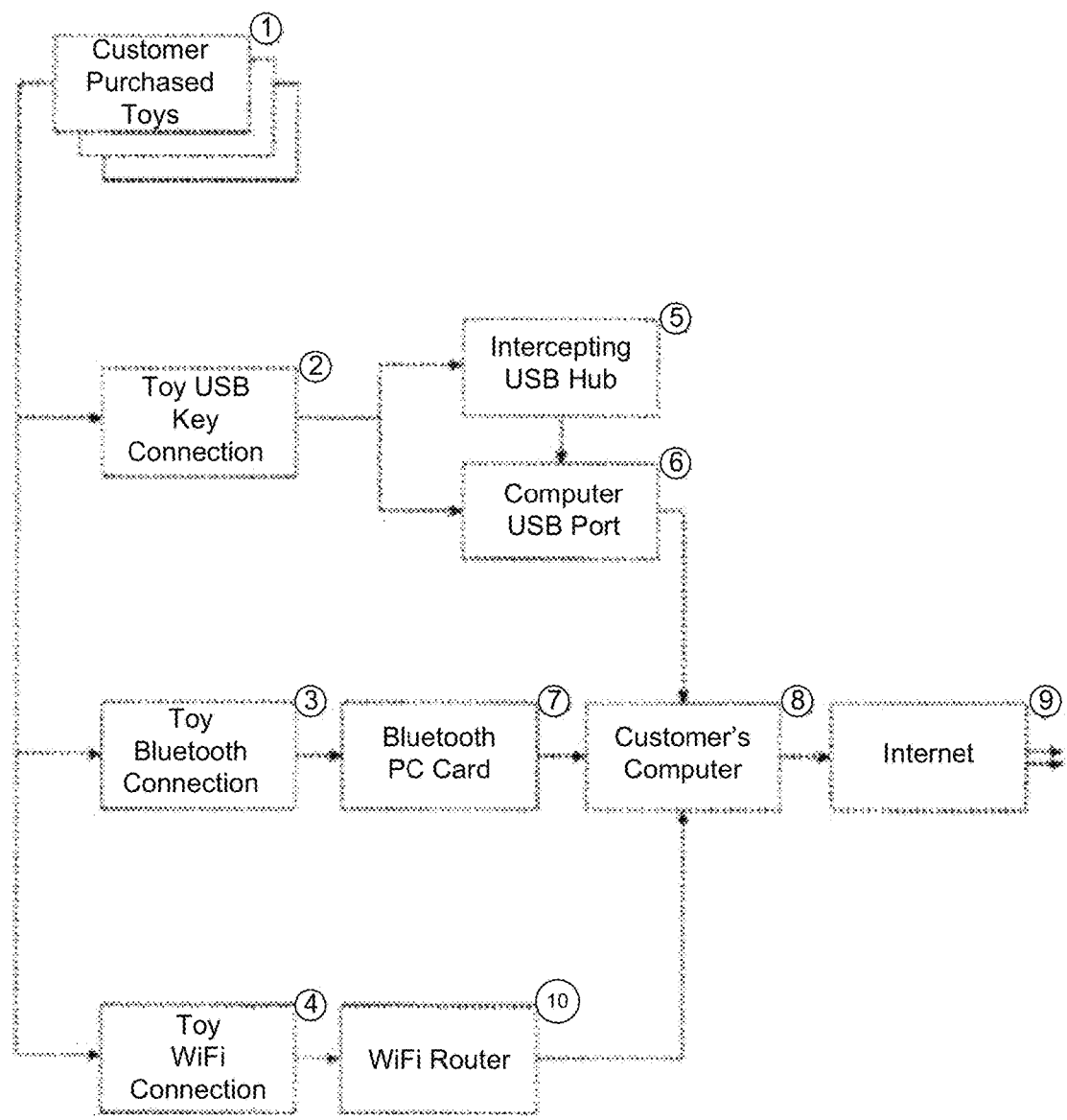
FIG. 50 illustrates various toy systems and means by which the virtual world commodity devices associated with these toy systems can provide access to a virtual world environment, in accordance with various exemplary embodiments of the present invention. BLOCK 2 of FIG. 50 represents a toy system with a virtual world commodity device having a USB connection port.

FIG. 50 illustrates various toy systems and means by which the virtual world commodity devices associated with these toy systems can provide access to a virtual world environment, in accordance with various exemplary embodiments of the present invention. BLOCK 2 of FIG. 50 represents a toy system with a virtual world commodity device having a USB connection port. This embodiment of the toy system can connect to virtual world environment via an intercepting USB hub represented in BLOCK 5 or a computer USB port represented in BLOCK 6.

The second method of virtual world environment access with an exemplary embodiment of the virtual world commodity device is with the integrated Bluetooth® technology as indicated in BLOCK 3. With this option the user can pair up the virtual world commodity device with the computer that they will be using via a Bluetooh® connection. In an exemplary embodiment, the user can activate the virtual world commodity device contained within the toy system by pressing and holding the Bluetooth® button down for 3 seconds. In an exemplary embodiment, this will cause the light on the virtual world commodity device of the toy system to flash rapidly. Once the light is flashing it will be in pair mode in an exemplary embodiment. The user can now pair the computer up with the virtual world commodity device in the toy system based on the computers Bluetooth® paring instructions.

In an exemplary embodiment of the virtual world commodity device, after the initial paring has taken place, the user can press the Bluetooth® button once for a brief moment and the toy will automatically sync up with the previously paired computer. When the virtual world commodity device has made a Bluetooth® connection with the computer, in an exemplary embodiment, it can automatically launch the software preloaded on the virtual world commodity device. This software can attempt to make to access to a virtual world environment.

The third method of access depicted in FIG. 50 is with a virtual world commodity device having integrated WiFi technology, as indicated in BLOCK 4. The WiFi connection can allow the user to interact with the toy without the necessity of a valid internet connection. If the user wishes to establish a WiFi connection, the user can press the WiFi button of the virtual world commodity device on the bottom of the toy system in an exemplary embodiment. This can activate the integrated WiFi technology and begin go look for an available WiFi network as seen in BLOCK 10. Once a network is identified it can give the user the option to make a connection to the virtual world commodity device of the toy system. If the user makes a valid WiFi connection to the virtual world commodity device, then they can be given an option to authenticate the virtual world commodity device of the toy system over the communication network, like the internet, or play with the integrated games and solutions stored in the virtual world commodity device or the toy system.

Figure 51:
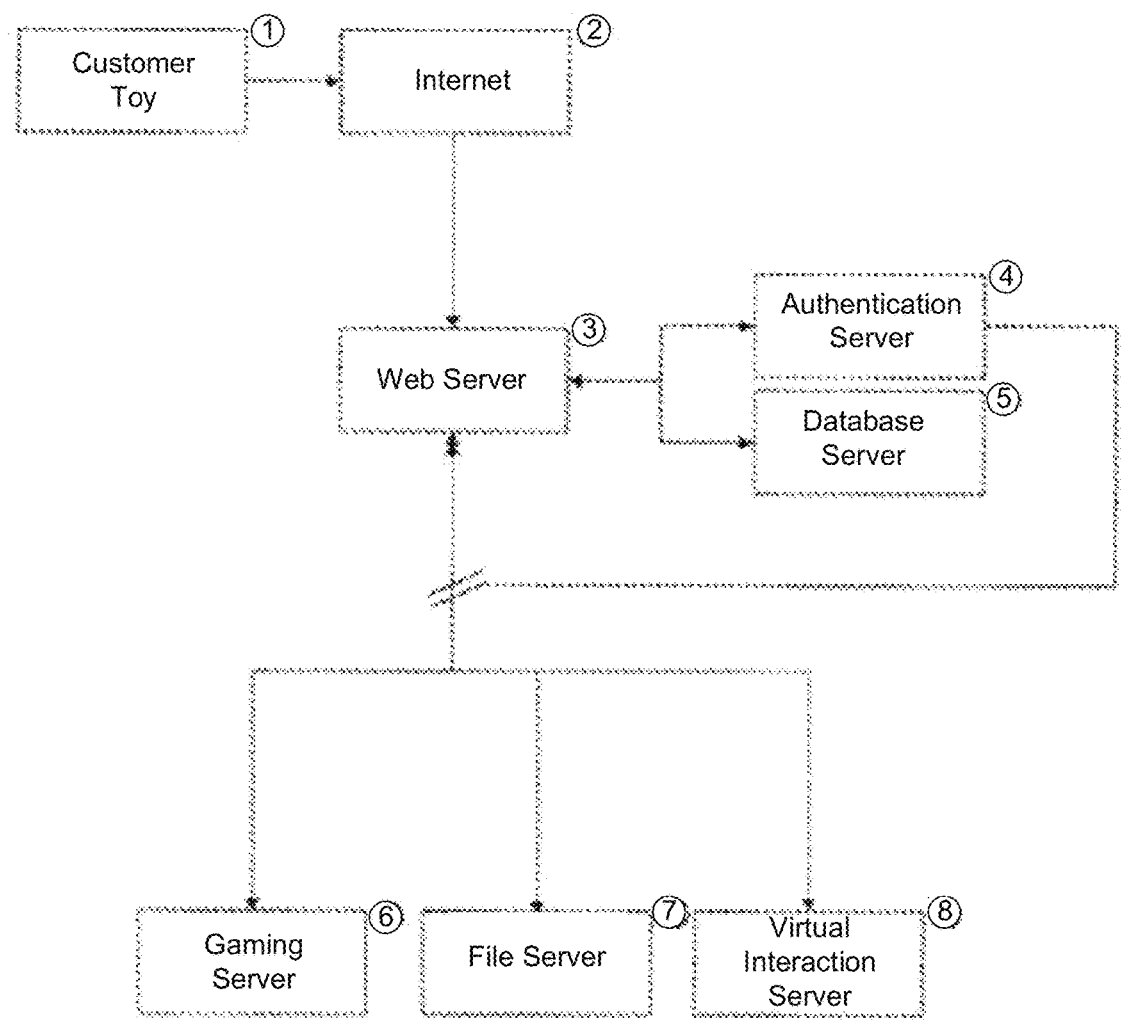
FIG. 51 illustrates the overall authentication process for granting anonyms access to the various virtual world environments in accordance with an exemplary embodiment of the present invention.

FIG. 51 illustrates the overall authentication process for granting anonyms access to the various virtual world environments in accordance with an exemplary embodiment of the present invention. As shown in FIG. 51, the process can begin with the user after they make the initial purchase of a Kizmoto toy system as indicated in BLOCK 1.

After the user has made a valid connection to a computer connected to the internet, such as with one of the three embodiments illustrated in FIG. 51, the embedded software can automatically launch to access the virtual world environment authentication server. They can first verify the necessary internet connection as shown in BLOCK 2. After the internet connection has been identified, communication can be established with the virtual world environment server as indicted in BLOCK 3. Now that the web server has been located, the software can send the product unique identifier to the authentication server via the virtual world environment server as illustrated in BLOCK 4. The authentication server can process the product unique identifier and validate its authenticity. Once the product unique identifier has been validated, the authentication server can determine what virtual playground of the virtual world environment the user entitled to access. The authentication server can then communicate back with the virtual world environment server in order to grant the access.

The virtual world environment server can then communication with the database server in order to establish the necessary access parameters in order to start the anonymous session as seen in BLOCK 5. Now that the session is set up, the user can be granted access to the gaming server as seen in BLOCK 5. The gaming server can allow the user to play in the arcade, quiz room or access many other fun filled activity as seen in BLOCK 6. The process can also allow the user to access one or more Kiz Toys virtual playgrounds as seen in BLOCK 8. Both of these servers can constantly interact with the web server in order to communicate with the file server. All of this access can done without the virtual world environment server every knowing the identity of the user or of a particular virtual world commodity device. Furthermore, data with respect to an individual virtual toy or other virtual world entity can be tracked and stored in the commodity data set, which can be downloaded to the virtual world commodity device.

While the invention has been disclosed in its preferred forms, it will be apparent to those skilled in the art that many modifications, additions, and deletions can be made therein without departing from the spirit and scope of the invention as set forth in the following claims.

What is claimed is:
1. A system comprising:
  a virtual world commodity device including a housing and a memory, the memory comprising data associated with the virtual world commodity device;

wherein the virtual world commodity device is enabled to communicate with a virtual world environment to provide at least a portion of the data associated with the virtual world commodity device; and wherein the at least a portion of the data associated with the virtual world commodity device is associated with a first anonymous profile of a first user associated with a virtual world commodity in the virtual world environment and enables the virtual world environment to provide a virtual representation of the virtual world commodity device, wherein the first anonymous profile comprises information corresponding to one or more commodities accrued by the first user in the virtual world environment and does not contain (i) any personal information provided by the first user or (ii) any information regarding physical monetary transactions, wherein the first anonymous profile is dissociable from the virtual world commodity device such that a second anonymous profile of a second user can be associated with the virtual world commodity device.

2. The system of claim 1, wherein the at least a portion of the data associated with the virtual world commodity device is indicative of a unique identifier for the virtual world commodity device.

3. The system of claim 2, wherein the unique identifier is at least one of a product unique identifier and a global unique identifier.

4. The system of claim 1, wherein the virtual representation of the virtual commodity device is manipulable by the first user in the virtual world environment.

5. The system of claim 1, wherein the memory is detachably coupled to the housing.

6. The system of claim 1, wherein the housing of the virtual world commodity device defines a toy.

7. The system of claim 1, wherein the at least a portion of the data associated with the virtual world commodity device is anonymously associated with the virtual world commodity in the virtual world environment without requiring personal information from the first user of the virtual world commodity device.

8. The system of claim 1, wherein the at least a portion of the data associated with the virtual world commodity device is associated with a profile for the virtual world commodity device in the virtual world environment.

9. The system of claim 1, wherein the virtual world commodity device communicates with the virtual world environment via at least one of a wired or wireless connection.

10. The system of claim 1, wherein the first anonymous profile is an online profile.

11. A virtual world commodity device comprising:
a housing; and
a memory coupled to the housing, the memory comprising data associated with the virtual world commodity device;
wherein the virtual world commodity device is enabled to communicate with a virtual world environment to provide at least a portion of the data associated with the virtual world commodity device;
wherein the at least a portion of the data associated with the virtual world commodity device is associated with a first anonymous profile of a first user associated with a virtual world commodity in the virtual world environment and enables the virtual world environment to provide a virtual representation of the virtual world commodity device, wherein the first anonymous profile comprises information corresponding to one or more commodities accrued by the first user in the virtual world environment and does not contain (i) any personal information provided by the first user or (ii) any information regarding physical monetary transactions;

wherein the at least a portion of the data associated with virtual world commodity device includes at least one of a product unique identifier and a global unique identifier;

wherein the virtual representation of the virtual commodity device is manipulable by the first user in the virtual world environment;

wherein the first anonymous profile is dissociable from the virtual world commodity device such that a second anonymous profile of a second user can be associated with the virtual world commodity device.

12. A method comprising:
enabling communication between a virtual world commodity device and a virtual world environment, the virtual world commodity device including a housing and a memory, the memory comprising data associated with the virtual world commodity device;
associating at least a portion of the data associated with the virtual world commodity device with a first anonymous profile of a first user associated with a virtual world commodity in the virtual world environment, wherein the first anonymous profile comprises information corresponding to one or more commodities accrued by the first user in the virtual world environment and does not contain (i) any personal information provided by the first user or (ii) any information regarding physical monetary transactions, wherein the first anonymous profile is dissociable from the virtual world commodity device such that a second anonymous profile of a second user can be associated with the virtual world commodity device; and
providing a virtual representation of the virtual world commodity device in the virtual world environment based on the at least a portion of the data associated with the virtual world commodity device.

13. The method of claim 12, wherein the at least a portion of the data associated with the virtual world commodity device is indicative of a unique identifier for the virtual world commodity device.

14. The method of claim 13, wherein the unique identifier is at least one of a product unique identifier and a global unique identifier.

15. The method of claim 12, further comprising manipulating the virtual representation of the virtual commodity device in the virtual world environment.

16. The method of claim 12, further comprising detachably coupling the memory to the housing.

17. The method of claim 12, wherein the housing of the virtual world commodity device defines a toy.

18. The method of claim 12, further comprising anonymously associating at the least a portion of the data associated with the virtual world commodity device with the virtual world commodity in the virtual world environment.

19. The method of claim 12, further comprising associating the at least a portion of the data associated with the virtual world commodity device with a profile for the virtual world commodity device in the virtual world environment.

20. The method of claim 12, further comprising enabling communication between a virtual world commodity device and a virtual world environment via at least one of a wired or wireless connection.

* * * * *